United States Patent
Vrcelj et al.

(10) Patent No.: US 8,428,001 B2
(45) Date of Patent: Apr. 23, 2013

(54) TIMING CORRECTIONS IN A MULTI CARRIER SYSTEM AND PROPAGATION TO A CHANNEL ESTIMATION TIME FILTER

(75) Inventors: Bojan Vrcelj, San Diego, CA (US); Ashok Mantravadi, San Diego, CA (US); Fuyun Ling, San Diego, CA (US); Krishna Kiran Mukkavilli, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 685 days.

(21) Appl. No.: 11/373,764

(22) Filed: Mar. 9, 2006

(65) Prior Publication Data
US 2006/0227812 A1  Oct. 12, 2006

Related U.S. Application Data

(60) Provisional application No. 60/660,905, filed on Mar. 10, 2005.

(51) Int. Cl.
*H04B 7/212* (2006.01)

(52) U.S. Cl.
USPC .......................................................... 370/324

(58) Field of Classification Search .................. 370/324; 455/13.2
See application file for complete search history.

(56) References Cited

U.S. PATENT DOCUMENTS

| 4,630,305 A | 12/1986 | Borth et al. |
| 5,790,939 A * | 8/1998 | Malcolm et al. ............. 455/13.2 |
| 5,852,630 A | 12/1998 | Langberg et al. |
| 5,912,931 A * | 6/1999 | Matsumoto et al. .......... 375/340 |
| 6,269,075 B1 * | 7/2001 | Tran ............................... 370/206 |
| 6,456,654 B1 * | 9/2002 | Ginesi et al. .................. 375/229 |
| 6,539,063 B1 | 3/2003 | Peyla et al. |
| 6,587,526 B1 * | 7/2003 | Li et al. ......................... 375/355 |
| 6,654,429 B1 * | 11/2003 | Li .................................. 375/316 |
| 6,771,591 B1 | 8/2004 | Belotserkovsky et al. |
| 6,859,505 B2 | 2/2005 | Agami et al. |

(Continued)

FOREIGN PATENT DOCUMENTS

| CN | 1518809 A | 8/2004 |
| CN | 1885726 A | 12/2006 |

(Continued)

OTHER PUBLICATIONS

Larsson, E.G. et al:"An Algorithm for Joint Symbol Timing and Channel Estimation for OFDM Systems" Statistical Signal Processing, 2001. Proceedings of the 11th IEEE Signal Processing Workshop on Aug. 6-8, 2001, Piscataway, NJ, USA, IEEE, Aug. 6, 2001, pp. 393-396.

(Continued)

*Primary Examiner* — Fan Ng
(74) *Attorney, Agent, or Firm* — Fulbright & Jaworski L.L.P.

(57) ABSTRACT

Systems and methods are provided for determining and applying timing corrections in a digital communications system. In an aspect, a timing correction method is provided for a multi-carrier system. This includes aligning two or more symbols with respect to each other from a symbol subset in order to account for timing differences between the symbols. The symbol alignment is first carried out to generate channel estimates for data demodulation. The channel estimates, thus generated, along with the timing alignment information are in turn used for determining timing corrections-to be applied to future symbols.

61 Claims, 14 Drawing Sheets

U.S. PATENT DOCUMENTS

| | | | |
|---|---|---|---|
| 6,996,385 B2* | 2/2006 | Messier et al. | 455/226.3 |
| 7,027,540 B2 | 4/2006 | Wilson et al. | |
| 7,158,770 B2* | 1/2007 | Hanaoka et al. | 455/226.1 |
| 7,161,987 B2 | 1/2007 | Webster et al. | |
| 7,167,456 B2* | 1/2007 | Iwamatsu et al. | 370/321 |
| 7,239,203 B2 | 7/2007 | Shanbhag | |
| 7,292,651 B2* | 11/2007 | Li | 375/316 |
| 7,372,893 B2* | 5/2008 | Park et al. | 375/147 |
| 7,457,231 B2 | 11/2008 | Vijayan et al. | |
| 7,463,691 B2 | 12/2008 | Tao et al. | |
| 7,548,594 B2 | 6/2009 | Wang | |
| 7,701,917 B2 | 4/2010 | Mantravadi et al. | |
| 8,098,567 B2 | 1/2012 | Brehler et al. | |
| 2002/0094021 A1* | 7/2002 | Eo et al. | 375/148 |
| 2003/0058365 A1 | 3/2003 | MacInnis et al. | |
| 2004/0062215 A1* | 4/2004 | Sato | 370/320 |
| 2004/0081205 A1* | 4/2004 | Coulson | 370/503 |
| 2004/0184484 A1* | 9/2004 | Marchok et al. | 370/480 |
| 2004/0233875 A1* | 11/2004 | Hayashi | 370/335 |
| 2005/0002478 A1* | 1/2005 | Agami et al. | 375/345 |
| 2005/0068990 A1* | 3/2005 | Liu | 370/516 |
| 2005/0099230 A1 | 5/2005 | Shanbhag | |
| 2005/0135432 A1* | 6/2005 | Kelley et al. | 370/532 |
| 2005/0141657 A1* | 6/2005 | Maltsev et al. | 375/346 |
| 2005/0163257 A1 | 7/2005 | Keerthi | |
| 2005/0176436 A1* | 8/2005 | Mantravadi et al. | 455/450 |
| 2005/0195763 A1 | 9/2005 | Kadous et al. | |
| 2006/0104380 A1 | 5/2006 | Magee et al. | |
| 2006/0215539 A1 | 9/2006 | Vrcelj et al. | |
| 2006/0285599 A1 | 12/2006 | Seki et al. | |
| 2007/0023063 A1 | 2/2007 | Deuel | |
| 2007/0160119 A1* | 7/2007 | Ardichvili et al. | 375/149 |
| 2007/0230635 A1 | 10/2007 | Wilhelmsson et al. | |
| 2008/0084817 A1 | 4/2008 | Beckman et al. | |
| 2008/0219332 A1 | 9/2008 | Brehler | |

FOREIGN PATENT DOCUMENTS

| | | |
|---|---|---|
| EP | 1737173 | 12/2006 |
| JP | 2005510963 A | 4/2005 |
| JP | 2006295727 A | 10/2006 |
| JP | 2006352746 A | 12/2006 |
| KR | 20010108236 | 12/2001 |
| WO | 01/59980 A1 | 8/2001 |
| WO | WO2008016051 A1 | 2/2008 |

OTHER PUBLICATIONS

Li. et al., "Robust Channel Estimation for OFDM Systems with Rapid Dispersive Fading Channels," IEEE Transactions on Communications, vol. 46, Issue 7, Jul. 1996, pp. 902-915.

Linde, "An AGC Strategy for Adaptive Digital Modems in Frequency Hopping Applications," Southern African Conference on Communications and Signal Processing, 1989. COMSIG 1989. Jun. 23, 1989, Stellenbosch, South Africa, pp. 19-24.

Wang, et al., "Performance of Linear Interpolation-Based MIMO Detection for MIMO-OFDM Systems," 2004 IEEE Wireless Communications and Networking Conference, WCNC. Mar. 21-25, 2004. Atlanta, GA, vol. 2, pp. 961-986.

International Search Report—PCT/US06/008490, International Search Authority—European Patent Office, Nov. 2, 2006.

Written Opinion—PCT/06/008490, International Search Authority—European Patent Office, Nov. 2, 2006.

International Preliminary Report on Patentability—PCT/US06/008490. The International Bureau of WIPO—Geneva, Switzerland, Sep. 20, 2007.

Translation of Office Action in Korean application 2009-7001568 corresponding to U.S. Appl. No. 11/373,764, citing KR20010108236 dated Mar. 18, 2011.

Itami M., et al., "A Study on Equalization of OFDM Signal using Scattered Pilot Symbols," Journal of the Institute of Image Information and Television Engineers, Nov. 20, 1998, vol. 52, No. 11, pp. 1650-1657.

Takaoka S., et al., "Pilot-assisted Adaptive Interpolation Channel Extimation for OFDM Signals," Technical Report of the Institute of Electronics, Information and Communication Engineers, Nov. 13, 2003, vol. 103, No. 456, pp. 51-56, RCS 2003-160.

* cited by examiner

TIMING CORRECTIONS IN A MULTI CARRIER SYSTEM AND PROPAGATION TO A CHANNEL ESTIMATION TIME FILTER

CROSS REFERENCE TO RELATED APPLICATION

This application claims the benefit of U.S. Provisional Patent Application Ser. No. 60/660,905 filed on Mar. 10, 2005, entitled "Interaction Between Time Tracking Algorithms and Channel Estimation in Wireless Communication" the entirety of which is incorporated herein by reference.

BACKGROUND

I. Field

The subject technology relates generally to communications systems and methods, and more particularly to systems and methods that perform timing corrections that are applied to channel estimates across pilot symbols in wireless networks.

II. Background

Orthogonal frequency-division multiplexing (OFDM) is a method of digital modulation in which a signal is split into several narrowband channels at different frequencies. These channels are sometimes called subbands or subcarriers. The technology was first conceived during research into minimizing interference among channels near each other in frequency. In some respects, OFDM is similar to conventional frequency-division multiplexing (FDM). The difference lies in the way in which the signals are modulated and demodulated. Generally, priority is given to minimizing the interference, or crosstalk, among the channels and symbols comprising the data stream.

In one area, OFDM has also been used in European digital audio broadcast services. The technology lends itself to digital television, and is being considered as a method of obtaining high-speed digital data transmission over conventional telephone lines. It is also used in wireless local area networks. Orthogonal Frequency Division Multiplexing can be considered an FDM modulation technique for transmitting large amounts of digital data over a radio wave where OFDM operates by splitting a radio signal into multiple smaller sub-signals or sub-carriers that are then transmitted simultaneously at different frequencies to the receiver. One advantage of OFDM technology is that it reduces the amount of crosstalk in signal transmissions where current specifications such as 802.11a WLAN, 802.16 and WiMAX technologies employ various OFDM aspects. Another example of OFDM based wireless system is FLO (Forward Link Only). FLO is a wireless system that has been developed to efficiently broadcast real time audio and video signals to mobile receivers using the OFDM technology.

Wireless communication systems such as FLO are designed to work in a mobile environment where the channel characteristics in terms of the number of channel taps with significant energy, path gains and the path delays are expected to vary quite significantly over a period of time. In an OFDM system, the timing synchronization block in the receiver responds to changes in the channel profile by selecting the OFDM symbol boundary appropriately to maximize the energy captured in the FFT window. When such timing corrections take place, it is important that the channel estimation algorithm takes the timing corrections into account while computing the channel estimate to be used for demodulating a given OFDM symbol. In some implementations, the channel estimate is also used to determine timing adjustment to the symbol boundary that needs to be applied to future symbols, thus resulting in a subtle interplay between timing corrections that have already been introduced and the timing corrections that will be determined for the future symbols. Further, it is common for channel estimation block to process pilot observations from multiple OFDM symbols in order to result in a channel estimate that has better noise averaging and also resolves longer channel delay spreads. When pilot observations from multiple OFDM symbols are processed together to generate channel estimate, it is important that the underlying OFDM symbols are aligned with respect to the symbol timing. Without such alignment, erroneous channel estimates will be generated and thus proper operation of wireless receivers cannot be ensured.

SUMMARY

The following presents a simplified summary of various embodiments in order to provide a basic understanding of some aspects of the embodiments. This summary is not an extensive overview. It is not intended to identify key/critical elements or to delineate the scope of the embodiments disclosed herein. Its sole purpose is to present some concepts in a simplified form as a prelude to the more detailed description that is presented later.

Timing corrections are determined for multi carrier systems in a wireless network when multiple symbols are processed by a wireless receiver. The timing corrections are applied to a channel estimate which is obtained from pilot observations across several symbols. Generally, each one of these symbols can potentially be using a different FFT window due to different timing corrections across the symbols of interest. The timing offsets are applied to account for potential drifts in the sampling clocks and the mobility of the receiver resulting in dynamic channel conditions while receiving signal from a given transmitter.

In an embodiment, symbols within a symbol subset (e.g., 3 symbols) are first aligned in time with respect to themselves. From the timing information gained and determined from this initial alignment, subsequent symbol alignments or adjustments occur during the demodulation process of received symbols. For example, while demodulating the current symbol, timing changes and corrections can be applied to a preceding or subsequent symbol. Thus, different time bases are continually being determined where in some cases a new determined time is applied to a respective symbol, and in other cases, a previous timing is applied to account for timing differences between the symbols. In one aspect, a timing correction method is provided for a multi-carrier system. This includes aligning two or more symbols with respect to each other from a symbol subset in order to account for timing differences between the symbols. The process then employs the timing differences between the symbols to synchronize timing to one or more symbols in the symbol subset.

To the accomplishment of the foregoing and related ends, certain illustrative embodiments are described herein in connection with the following description and the annexed drawings. These aspects are indicative of various ways in which the embodiments may be practiced, all of which are intended to be covered.

DETAILED DESCRIPTION

Systems and methods are provided for determining timing corrections in a forward link only network. In one aspect, a timing correction method is provided for a multi-carrier system. This includes aligning two or more symbols with respect to each other from a symbol subset in order to account for timing differences between the symbols. The process then employs timing offsets between the symbols to synchronize timing to one or more symbols in the symbol subset. In one example, timing synchronization can be performed in a time filtering module that can be associated with in a channel estimation block.

As used in this application, the terms "component," "network," "system," "module," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a communications device and the device can be a component. One or more components may reside within a process and/or thread of execution and a component may be localized on one computer and/or distributed between two or more computers. Also, these components can execute from various computer readable media having various data structures stored thereon. The components may communicate over local and/or remote processes such as in accordance with a signal having one or more data packets (e.g., data from one component interacting with another component in a local system, distributed system, and/or across a wired or wireless network such as the Internet).

Figure 1:
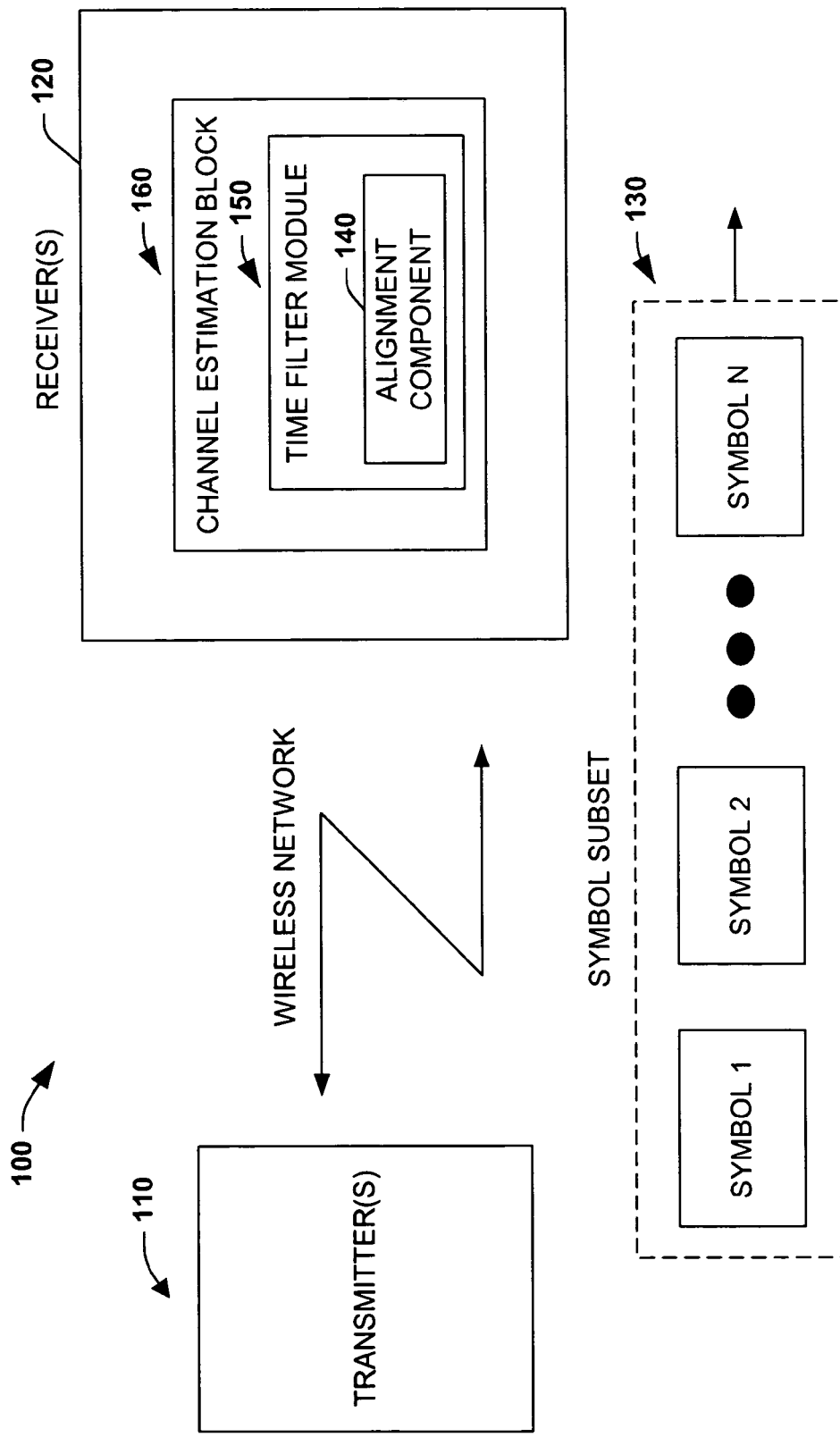
FIG. 1 is a schematic block diagram illustrating a wireless communications network and receiver that performs symbol timing corrections.

FIG. 1 illustrates a wireless network system 100 for performing timing corrections. The system 100 includes one or more transmitters 110 that communicate across a wireless network to one or more receivers 120. The receivers 120 can include substantially any type of communicating device such as a cell phone, computer, personal assistant, hand held or laptop devices, and so forth. Portions of the receiver 120 are employed to decode a symbol subset 130 having one or more symbols that may be sampled with a different symbol timing, whereby the receiver utilizes an alignment component 140 to resolve timing discrepancies among the symbols. Timing corrections are applied to a channel estimate at the receiver 120 are obtained from pilot observations across several symbols 130.

Generally, each one of the symbols 130 can potentially be using a different Fast Fourier Transform (FFT) window due to different timing corrections across the symbols of interest. Thus, timing offsets may be occurring due to potential drifts in the sampling clocks and the channel dynamics arising due to the mobility of the receiver 120 while receiving signal from a given set of one or more transmitters 110. As shown, the alignment component 140 may be associated with a time filter module 150 that operates with a channel estimation block 160. The symbol subset 130 is generally transmitted in an Orthogonal Frequency Division Multiplexing (OFDM) network that employs forward link only (FLO) protocols for multimedia data transfer. Channel estimation is generally based on uniformly spaced pilot tones inserted in the frequency domain, and in respective OFDM symbols. In a particular implementation, the pilots are spaced 8 carriers apart, and the number of pilot carriers is set at 512 (an overhead of 12.5%).

In one aspect, a multi-carrier communication system 100 is considered where frequency domain multiplexed (FDM) pilots placed within transmitted symbols are used for channel estimation. In this system, with FDM pilot staggering, several successive received symbols 130 can be used to extract more information about the propagation channel (obtaining longer channel estimates). In one example, this can be performed in the time filtering module 150 of the channel estimation block 160 via the alignment component 140. Since timing corrections can be performed concurrently with this process, the alignment component facilitates that different OFDM symbol timings that may occur across several neighboring symbols at 130 are taken into account inside the time filtering module 150. This time correction process also addresses interaction problems between the channel estimation and time synchronization blocks. In one aspect, a time correction component for a wireless receiver is provided. This can include means for receiving a symbol subset in an OFDM broadcast (e.g., 120), and means for filtering the symbol subset (e.g., 150). This can also include means for aligning symbols within the subset and means for aligning one symbol in view of a current demodulation of the symbol subset (e.g., 140).

In one embodiment, symbols within the symbol subset 130 are first aligned in time with respect to each other. For example, if three symbols were employed for channel estimation and subsequently for timing offset determination, then adjustments for differences between the three symbols would be determined. From the information gained and determined from the initial alignment, subsequent symbol alignments or adjustments occur during the demodulation process of received symbols which may be sampled at different symbol timing from the current symbol demodulation. For example, while demodulating the current symbol which may be the fourth symbol in the subset, timing changes and corrections can be applied concurrently by the alignment component 140 to a proceeding or subsequent symbol such as to symbol two in the subset, for example. Thus, different timings are continually being determined where in some cases a new determined timing offset is applied to a respective symbol, and in other cases, a previous timing is applied to account for timing differences between the symbols 130. It is noted that symbol timing corrections can occur in a plurality of combinations. For instance, if three symbols were employed, then potentially eight different combinations of adjustments could occur where one symbol's time was either held or adjusted in view of the other two symbol members in the subset 130. For example, a second symbol may have its timing corrected in view of a first symbols time and a third symbols time. In another example, symbol one may be adjusted in view of symbols two and three and so forth. As can be appreciated, different numbered symbol subsets 130 and timing corrections may be employed.

Timing synchronization in multi-carrier systems includes determining the correct position of an FFT sampling window used for demodulating OFDM symbols. Assuming that the equivalent channel between the transmitter and the receiver is characterized by a delay spread shorter than the length of the cyclic prefix embedded at the beginning of each symbol, it is possible to avoid the undesired aspects of inter-symbol interference (ISI). This may be contingent upon the ability of the receiver to recover the correct timing position from the input stream of data. An optimum position for FFT window placement (also referred to as symbol sampling) is starting from the first sample after the cyclic prefix. In OFDM systems, information about timing synchronization can be extracted from the channel estimates. These can be obtained with the help of pilot tones, using some preliminary knowledge about the correct sampling position. The choice of channel estimate-aided synchronization is motivated by the observation that any offset in the position of the FFT window used for channel estimation results in the appropriate shift of the estimate. Therefore, estimating this shift is generally equivalent to estimating the sampling offset. In many OFDM systems, the timing synchronization block uses the channel estimate obtained from previous data symbols to calculate drift from the ideal sampling position and applies this offset to arriving OFDM symbols.

The channel estimation system 100 can be designed in a manner that allows it to process channels of length up to twice the cyclic prefix or more. This can be achieved by pilot staggering. One aspect includes a so-called non-causal time filter at the receiver 120 which combines the channel observations from at least three consecutive OFDM symbols in order to calculate a longer channel estimate, which is then used for demodulation. If the synchronization unit indicates that a nonzero offset should be applied when sampling the next OFDM symbol, the corresponding channel observation will not be aligned with the two previous channel observations (since those resulted in a channel estimate not aligned with zero). Thus, the combination of these three observations may produce a distorted result. The remedy is to apply the appropriate transformation on the two previous channel estimates when timing offset is nonzero, so as to keep them aligned with the present one.

The following provides some introductory mathematical discussion for more detailed observations that are presented below. The $k^{th}$ received OFDM symbol in the frequency domain can be written as:

$$Y(k)=H(k)+w(k)=W_{P,D}h(k)+w(k) \quad \text{Equation 1}$$

where
  P is the number of pilots carriers, and D is the number of channel taps assumed by the receiver.
  the vectors Y,H,w are of length P and the noise w is white complex Gaussian with variance $N_0$.
  the matrix $W_{P,D}$ is the P×D submatrix of the unnormalized DFT matrix $$W_{N,N}(m, n) = \exp\left(-j\frac{2\pi mn}{N}\right)$$

where N is the total number of subcarriers.
  the vector h(k) is of length D and is normalized so that $$E[h(k)^H h(k)]=E_p$$

where $E_p$ is the received pilot symbol energy. With the above definitions, it is easy to see that the channel value at each carrier in the frequency domain satisfies $$E|H_p(k)|^2=E_p$$

From Equation 1, it is evident that the number of channel taps D≦P. However, longer channel estimate are generally desired for a) fine timing synchronization—while providing a longer channel estimate and positioning the FFT window to maximize the collected energy; and b) dealing with scenarios where the channel has a delay spread larger than the cyclic prefix. To generate a longer channel estimate, one aspect is to stagger the pilots in frequency across successive OFDM symbols, i.e., the pilot carrier indices are changed in successive OFDM symbols. For simplicity, it can be assumed a two symbol staggering pattern: e.g., for one example FLO system with 96 guard carriers, the pilot carrier indices are {50, 58, . . . ,4042} in the even symbols and {54, 62, . . . ,4046} in the odd symbols. More generally, if the uniformly spaced pilot carriers are of the form $$\frac{N}{P}n + n_0$$

in the even symbols, they would be $$\frac{N}{P}n + n_0 + \frac{N}{2P}$$

in the odd symbols.

With such staggering, an estimate can be received of up to a length 2P by using the pilot observations from at least two neighboring OFDM symbols. Specifically, assume a channel with 2P time domain taps (and set $n_0=2$). Then:

$$H_p(2k) = \sum_{l=0}^{2P-1} h_l(2k)e^{-j\frac{2\pi l[(N/P)+p+2]}{N}}$$

$$= \sum_{l=0}^{2P-1} h_l(2k)e^{-j\frac{2\pi lp}{P}} e^{-j\frac{4\pi l}{N}}$$

$$= \sum_{l=0}^{P-1} \left[h_l(2k) + e^{-j\frac{4\pi P}{N}} h_{l+P}(2k)\right] e^{-j\frac{2\pi lp}{P}} e^{-j\frac{4\pi l}{N}}$$

$$= \sum_{l=0}^{P-1} [h_l(2k) - jh_{l+P}(2k)] e^{-j\frac{2\pi lp}{P}} e^{-j\frac{4\pi l}{N}}, \quad \text{when } N = 8P$$

while $$H_p(2k+1) = \sum_{l=0}^{2P-1} h_l(2k+1)e^{-j\frac{2\pi l[(N/P)p+(N/2P)+2]}{N}}$$

$$= \sum_{l=0}^{P-1} [h_l(2k+1) + jh_{l+P}(2k+1)] e^{-j\frac{\pi l}{P}} e^{-j\frac{4\pi l}{N}} e^{-j\frac{2\pi lp}{P}},$$

$$= \text{when } N = 8P$$

Thus, the pilot observations in the even and odd symbols can be written as $$Y(2k) = W_{P,P}\Lambda_1[h^{actual}(2k) - jh^{excess}(2k)] + w(2k) \quad \text{Equation 2}$$
$$Y(2k+1) =$$
$$W_{P,P}\Lambda_2[h^{actual}(2k+1) + jjh^{excess}(2k+1)] + w(2k+1)$$

where $$\Lambda_1 = diag\left\{e^{-j\frac{4\pi l}{N}}\right\}_{l=0}^{D-1}, \Lambda_2 = diag\left\{e^{-j\frac{\pi l}{P}}e^{-j\frac{4\pi l}{N}}\right\}_{l=0}^{D-1}$$

and "actual" and "excess" refer to taps that correspond to l=0, . . . , P−1 and l=P, . . . , 2P−1 .

To determine an estimate of the channel from the observations in Equation 2, one step is to use the least-squares criterion:

$$\hat{h}(2k) = \Lambda_1^{-1} W_{P,P}^H Y(2k)$$
$$\hat{h}(2k+1) = \Lambda_2^{-1} W_{P,P}^H Y(2k+1) \quad \text{Equation 3}$$

The estimates above include actual and excess components. One possible way to get the full 2P tap channel estimate is:

$$\hat{h}^{actual} = \frac{\hat{h}(2k) + \hat{h}(2k+1)}{2}$$
$$\hat{h}^{excess} = \frac{\hat{h}(2k) - \hat{h}(2k+1)}{-2j}$$

However, this is a special case of a more general operation where the time-domain estimates in Equation 3 (obtained every OFDM symbol) are averaged across multiple OFDM symbols. This is the time-filtering step of channel estimation. Time-filtering can be performed individually for each time-domain tap separately, and the resulting estimate of tap l at any OFDM symbol m (odd or even) can be written as $$\overset{\square}{\hat{h}}_l(m) = \sum_{n=-N_f}^{N_b-1} \alpha_n \overset{\square}{\hat{h}}_l(m-n)$$

where $N_f$ and $N_b$ are the number of non-causal and causal taps, respectively. It is noted that, due to staggering, it may not be possible to filter the pilots in the frequency domain, and hence time-filtering is performed in the time-domain. In other words, the order of least-squares estimation and time-filtering possibly cannot be interchanged. The filter coefficients $\{\alpha_n\}$ provide a trade-off between gain due to collecting additional pilot energy from symbols other than the current symbol (reducing pilot noise), and loss due to channel variation across symbols (reducing time variation noise). Further, as illustrated above, since the estimates in Equation 3 includes contribution from the excess delay components, the time-filter coefficients can be used to suppress this contribution as well. Prior to time filtering of the channel estimates from several symbols, it is important to ensure that the channel estimates are aligned in time. The following discussion provides an example of means to determine and perform such timing alignment for channel estimates collected from several symbols prior to time filtering.

Figure 2:
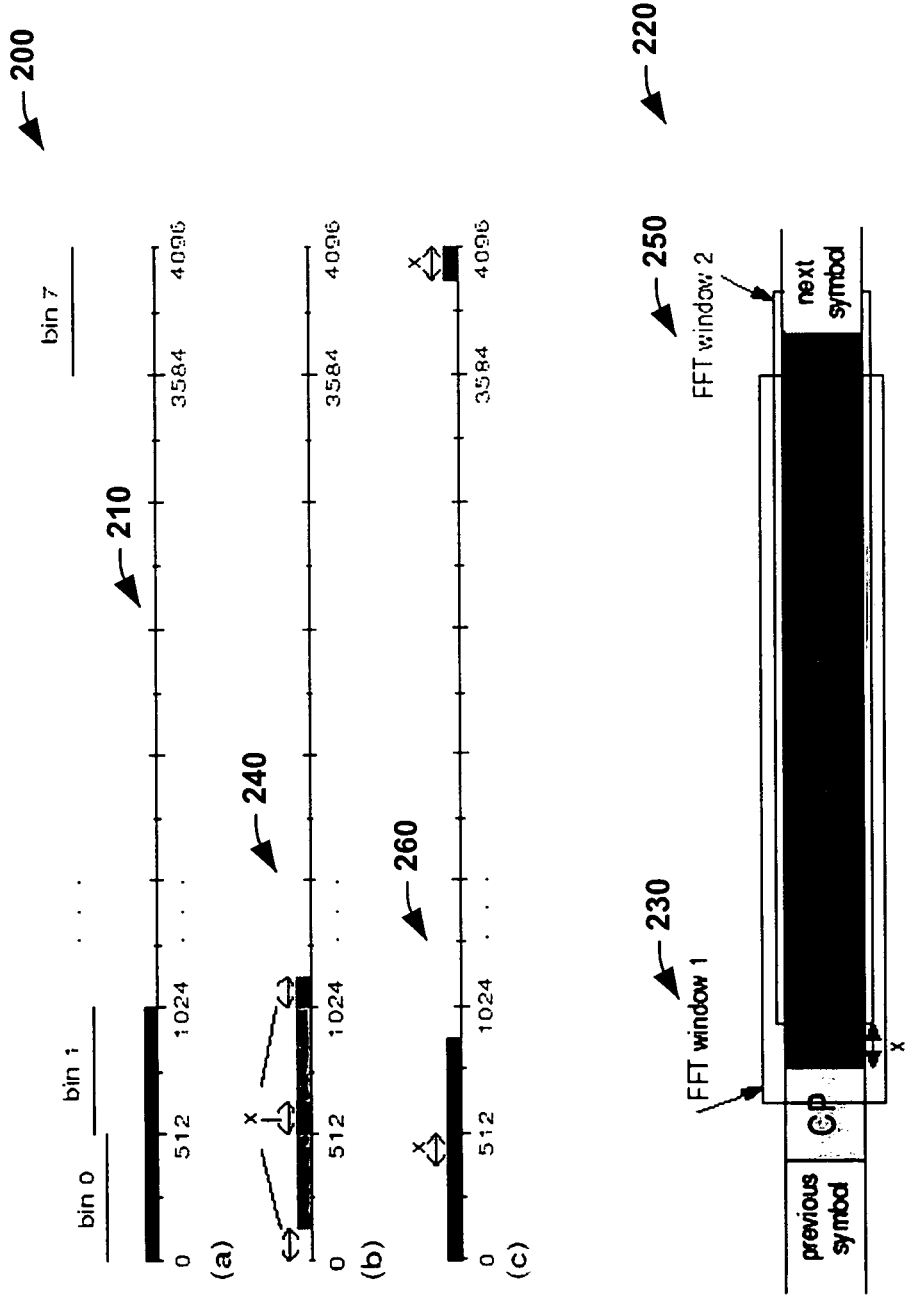
FIGS. 2 and 3 illustrate example timing aspects and corrections for a wireless communications network.
Figure 3:
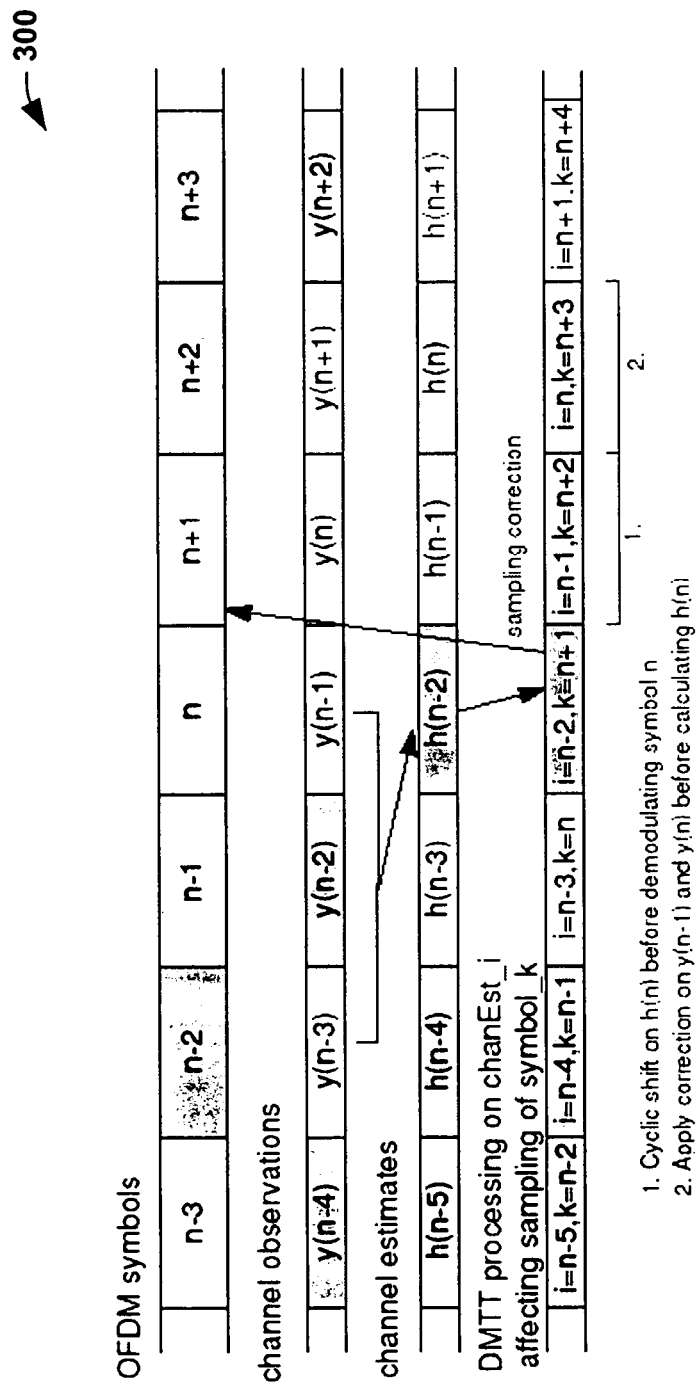

FIGS. 2-3 and the accompanying discussion provide various examples of how timing corrections can be performed in an OFDM system. It can be assumed that an actual composite channel is limited to M taps in time domain, namely $$H(z) = \sum_{m=0}^{M-1} h(m) z^{-m} \quad (1)$$

Also, in the following, bold face letters denote matrices and vectors. Symbol $W_K$ is reserved for a K×K DFT matrix and $I_K$ for a size-K identity matrix. If H(z) is a channel transfer function defined in (1), then use H[k] to denote its kth DFT coefficient (0≦k≦K−1), defined as $$H[k] = \sum_{m=0}^{M-1} h(m) e^{-j2\pi \frac{km}{K}}. \quad (2)$$

If K=4096, the coefficients (2) correspond to the frequency-domain channel gains on the carrier tones. In general, the dimension of the Fourier transform, K, should always be apparent from the context.

In the following description, consider the effects of misplaced symbol sampling on the channel observations. In order to study these effects, derive the channel observations based on pilots on interlace α, 0≦α≦7 when the timing alignment is perfect, but the channel is of length M=N=8P=4096 (here N is the number of subcarriers, P is the number of pilots). This yields $$\begin{bmatrix} H[0] \\ H[1] \\ \vdots \\ H[N-1] \end{bmatrix} = W_N \begin{bmatrix} h(0) \\ h(1) \\ \vdots \\ h(N-1) \end{bmatrix}.$$

Concentrating on channel values on a pilot interlace α, for 0≦l≦P−1 yields $$H[8l+\alpha] = \sum_{r=0}^{7} \left[ \sum_{p=0}^{P-1} h(p+rP) e^{-j2\pi \frac{lp}{P}} \right] \cdot e^{-j2\pi \frac{\alpha p}{N}} \cdot e^{-j2\pi \frac{r\alpha}{8}}. \quad (3)$$

Note that the summation in brackets represents the P-point DFT of the channel response within the rth alias bin. Referring to FIG. 2, a diagram 200 identifies eight alias bins for channels of length N=4096. The two phase correction terms in (3) are a consequence of: (a) considering a nonzero interlace, and (b) having fewer observations than channel taps, which results in alias terms. It is apparent from (3) that considering just a single interlace, it is not possible to identify channels of length M>P, due to this aliasing. This fact serves as a motivation for pilot staggering technique. Collecting equations (3) for different values of l, a matrix equality is provided $$\begin{bmatrix} H[\alpha] \\ H[8+\alpha] \\ \vdots \\ H[8(P-1)+\alpha] \end{bmatrix} = \begin{bmatrix} W_P \Delta_\alpha e^{-j2\pi \frac{\alpha}{8}} & W_P \Delta_\alpha & \cdots & e^{-j2\pi \frac{7\alpha}{8}} & W_P \Delta_\alpha \end{bmatrix}. \quad (4)$$

with $$\begin{bmatrix} h(0) \\ h(1) \\ \vdots \\ h(N-1) \end{bmatrix},$$

$$\Delta_\alpha \triangleq diag_{0 \le p \le P-1}\{e^{-j2\pi \frac{\alpha p}{N}}\}.$$

One conclusion is that each channel observation of the form (4) consists not only of the channel samples contained in the zeroth alias bin, with the appropriate phase corrections, but is a superposition of contents from all alias bins. Following a similar notation as above, denote the vector on the left-hand side of (4) by $Y_\alpha(n)$, where index n denotes the time instance at which the observation is collected and subscript denotes the corresponding interlace.

In one case, the timing synchronization is assumed to be perfect, thus there is no drift in the channel estimate. In other words, the estimated channel impulse response at 200 of FIG. 2 starts with h(0) positioned at place 0, as shown at 210 of FIG. 2. Recalling the assumption that the maximum delay spread corresponds to 1024 samples, it can be concluded that the channel observation $Y_\alpha(n)$ consists of alias bins 0 and 1 only. Thus, in this ideal case, yields $$y_\alpha(n) \triangleq \Delta_\alpha^{-1} W_P^{-1} Y_\alpha(n) = \begin{bmatrix} h(0) + e^{-j2\pi\frac{\alpha}{8}} h(P+0) \\ h(1) + e^{-j2\pi\frac{\alpha}{8}} h(P+1) \\ \vdots \\ h(P-1) + e^{-j2\pi\frac{\alpha}{8}} h(2P+1) \end{bmatrix}. \quad (5)$$

Denoting the vector of the first P taps of the channel at instance n by $h_\alpha(n)$ and the second P taps by $h_e(n)$, the right-hand side in (5) becomes $$h_a(n) + e^{-j2\pi\frac{\alpha}{8}} h_e(n).$$

Therefore, channels of length 2P can be estimated from two consecutive observations when pilots occupy interlaces 2 and 6 as $$h_a = \frac{y_2(n-1) + y_6(n)}{2}, \text{ and } h_e = \frac{y_2(n-1) - y_6(n)}{2j}.$$

This operation, only extended over three consecutive observations for better noise averaging, is implemented in a so-called non-causal time filter which operates in the channel estimation block. In the following, a description is provided how these observations and thus the channel estimate are affected by timing synchronization errors.

The channel estimate $h = [h_a^T h_e^T]^T$ at time n is calculated from observations $y_{\alpha 1}(n-1) y_{\alpha 2}(n)$, $y_{\alpha 2}((n)$ and $y_{\alpha 1}(n+1)$. Based on h, the data mode time tracking (DMTT) unit calculates the correct sampling position for the next OFDM symbol. Consider that the result of the timing synchronization suggests that the sampling position needs to be changed. This implies that inaccurate sampling was used to obtain the previous channel observations. In the following, the resulting impairments are described.

In FIG. 2 at 220, two possible timing errors are shown which result in wrong FFT window positions. Window position 1 at 230 is referred to as early sampling and leads to a delayed channel estimate—shown at 240. Note that in this case a total of three consecutive alias bins contain channel taps, which is reflected in the altered channel observation $$y_\alpha^{(early)}(n) = \begin{bmatrix} 0 & +e^{-j2\pi\frac{\alpha}{8}}h(P-x) & +e^{-j2\pi\frac{\alpha}{4}}h(2P-x) \\ 0 & +e^{-j2\pi\frac{\alpha}{8}}h(P-x+1) & +e^{-j2\pi\frac{\alpha}{4}}h(2P-x+1) \\ \vdots & \vdots & \vdots \\ 0 & +e^{-j2\pi\frac{\alpha}{8}}h(P-1) & +e^{-j2\pi\frac{\alpha}{4}}h(2P-1) \\ h(0) & +e^{-j2\pi\frac{\alpha}{8}}h(P) & +0 \\ \vdots & \vdots & \vdots \\ h(P-x-1) & +e^{-j2\pi\frac{\alpha}{8}}h(2P-x-1) & +0 \end{bmatrix}. \quad (6)$$

Similarly, in the case of late sampling (window position 2 at 250), an advanced channel estimate is observed. It is supposed to start from sample −x and end at 2P−x. However, since the insertion of cyclic prefix in OFDM systems transforms linear to circular convolutions, the equivalent channel estimate is shown at 260. Again, three circularly-consecutive alias bins are occupied: bins 7, 0 and 1. The corresponding channel observation is now $$y_\alpha^{(late)}(n) = \begin{bmatrix} h(x) & +e^{-j2\pi\frac{\alpha}{8}}h(P+x) & +0 \\ h(x+1) & +e^{-j2\pi\frac{\alpha}{8}}h(P+x+1) & +0 \\ \vdots & \vdots & \vdots \\ h(P-1) & +e^{-j2\pi\frac{\alpha}{8}}h(2P-1) & +0 \\ h(P) & +0 & +e^{-j2\pi\frac{7\alpha}{8}}h(0) \\ \vdots & \vdots & \vdots \\ h(P+x-1) & +0 & +e^{-j2\pi\frac{7\alpha}{8}}h(x-1) \end{bmatrix}. \quad (7)$$

The time tracking unit is supposed to correct the sampling instances for the future symbols, but in order to assure uninterrupted performance of the channel estimation time filter, the distortions in previous channel observations are to be undone.

The sequence of operations performed by the channel estimation and DMTT blocks is shown at 300 in FIG. 3. During the reception of symbol n, channel observations from symbols n−3, n−2 and n−1 are ready and channel estimate h(n−2) is calculated. At this point, a demodulation block can start operating on symbol n−2. Concurrently, DMTT unit observes h(n−2) and, based on the algorithm for timing synchronization, estimates the right sampling position for the next symbol (n+1).

Suppose that a nonzero sampling offset was detected at this moment, i.e., a sampling correction should be applied to symbol n+1 see the diagram 300. This signal triggers two other operations: cyclic rotation of the current channel estimate and correction of the previous channel observations. Without loss of generality, assume that a positive offset x was detected by DMTT, i.e., the sampling of symbols in the immediate past has been early. This corresponds to 240 of FIG. 2. Note that the timing correction applied does not affect the computation of the channel estimate for symbol n−1 which uses pilot observations from symbols n−2, n−1 and n. Hence, no modifications need to be applied for demodulation data from symbol n−1. During the next OFDM symbol, channel observations y(n−1), y(n) and y(n+1) are used to calculate h(n). Note that y(n+1) is obtained with the latest timing, while y(n−1) and y(n) are probably corrupted. However, the channel estimate h(n) that is computed for symbol n should match the timing window used for sampling the nth symbol. If this is not done, there will be a mismatch between the channel gains experienced by the nth symbol and the channel estimate h(n) generated to decode the data in the nth OFDM symbol. Hence, appropriate corrections will be applied to y(n+1) to match the symbol timing of y(n−1) and y(n) to generate h(n).

During the next OFDM symbol, channel observations y(n), y(n+1) and y(n+2) will be used to generate the channel estimate h(n+1) to demodulate data from y(n+1). Note that new timing has been applied starting from y(n+1), so that y(n+1) and y(n+2) arrive with the same timing while y(n) arrives with a different timing. Since, the channel estimate h(n+1) is generated to demodulate y(n+1), it should be ensured that h(n+1) carries the timing used for y(n+1). Therefore, timing corrections will be applied to y(n) to match the timing of y(n+1) and y(n+2) to generate h(n+1). In this manner, it is assumed that the channel estimates from h(n+2) on are aligned with zero, until the next channel drift causes DMTT unit to react. The nature of the timing corrections to be applied along with the operations involved for relative early and late sampling of OFDM symbols is presented below.

A transformation back to a desired form is given by the following matrices (α denotes the pilot interlace in the following)

early sampling correction:

$$y_\alpha(n) = \begin{bmatrix} 0_{(P-x) \times x} & I_{P-x} \\ e^{j2\pi \frac{\alpha}{8}} \cdot I_x & 0_{x \times (P-x)} \end{bmatrix} \cdot y_\alpha^{(early)}(n), \quad (8)$$

late sampling correction:

$$y_\alpha(n) = \begin{bmatrix} 0_{x \times (P-x)} & e^{-j2\pi \frac{\alpha}{8}} \cdot I_x \\ I_{P-x} & 0_{(P-x) \times x} \end{bmatrix} \cdot y_\alpha^{(late)}(n). \quad (9)$$

Note that early sampling correction by x samples on $y_\alpha^{early}(n)$ is easily implemented by first performing a cyclic right shift of x samples on $y_\alpha^{early}(n)$ and then multiplying the first x samples (those that spill over) by $$e^{j\frac{2\pi\alpha}{8}}.$$

Similarly, late sampling correction by x samples on $y_\alpha^{late}(n)$ can be implemented by first performing a cyclic left shift of x samples on $y_\alpha^{late}(n)$ and then multiplying the last x samples (those that spill over) by $$e^{j\frac{2\pi\alpha}{8}}.$$

These transformations amount to a simple cyclic-shift followed by a constant complex multiplication applied on a portion of samples. The sequence of operations is summarized in the following:

1. If the offset provided by the DMTT unit is x>0 during OFDM symbol (n+1)
    Start the sampling of the next OFDM symbol, n+2, by x samples late.
    To obtain channel estimate h(n+1) for symbol n+1, cyclically shift the future channel observations from y(n+2) by x samples to the right and apply the early sampling correction as given in Equation 8 above.
    To obtain channel estimate h(n+2) for symbol n+2, cyclically-shift the previous channel observations y(n+1) by x samples to the left, and apply the late sampling correction as given in Equation 9 above.
2. Else, if the offset provided by the DMTT unit is x<0
    Start the sampling of the next OFDM symbol, n+2, by x samples early.
    To obtain channel estimate h(n+1) for symbol n+1, cyclically shift the future channel observations from y(n+2) by x samples to the left and apply the late sampling correction as given in Equation 9 above.
    To obtain channel estimate h(n+2) for symbol n+2, cyclically-shift the previous channel observations y(n+1) by x samples to the right, and apply the early sampling correction as given in Equation 8 above.

Note that even though the above discussion is carried out using an example of a non-causal time filter with one non-causal tap, the technique discussed is quite general in scope and can be easily extended to time filter of any length. In the above example, it was also assumed that only one symbol is out of sync and hence needs to be aligned with the other symbols. In a more general case, all the symbols processed by the channel estimation algorithm would arrive with different symbol timing. The above concept of early sampling and late sampling correction will then be applied to each symbol with an argument given by the corresponding timing offset. In particular, it should be ensured that the timing of all the channel observations used for processing should match the timing used to generate the samples for the OFDM symbol that is to be decoded.

At the end of the above set of operations, the channel estimates are all aligned in time to enable time filtering of the time domain channel estimates. Assuming that there is no excess delay spread (see discussion below), and that the channel is truncated to P taps, the loss with channel estimation can be analyzed.

Figure 4:
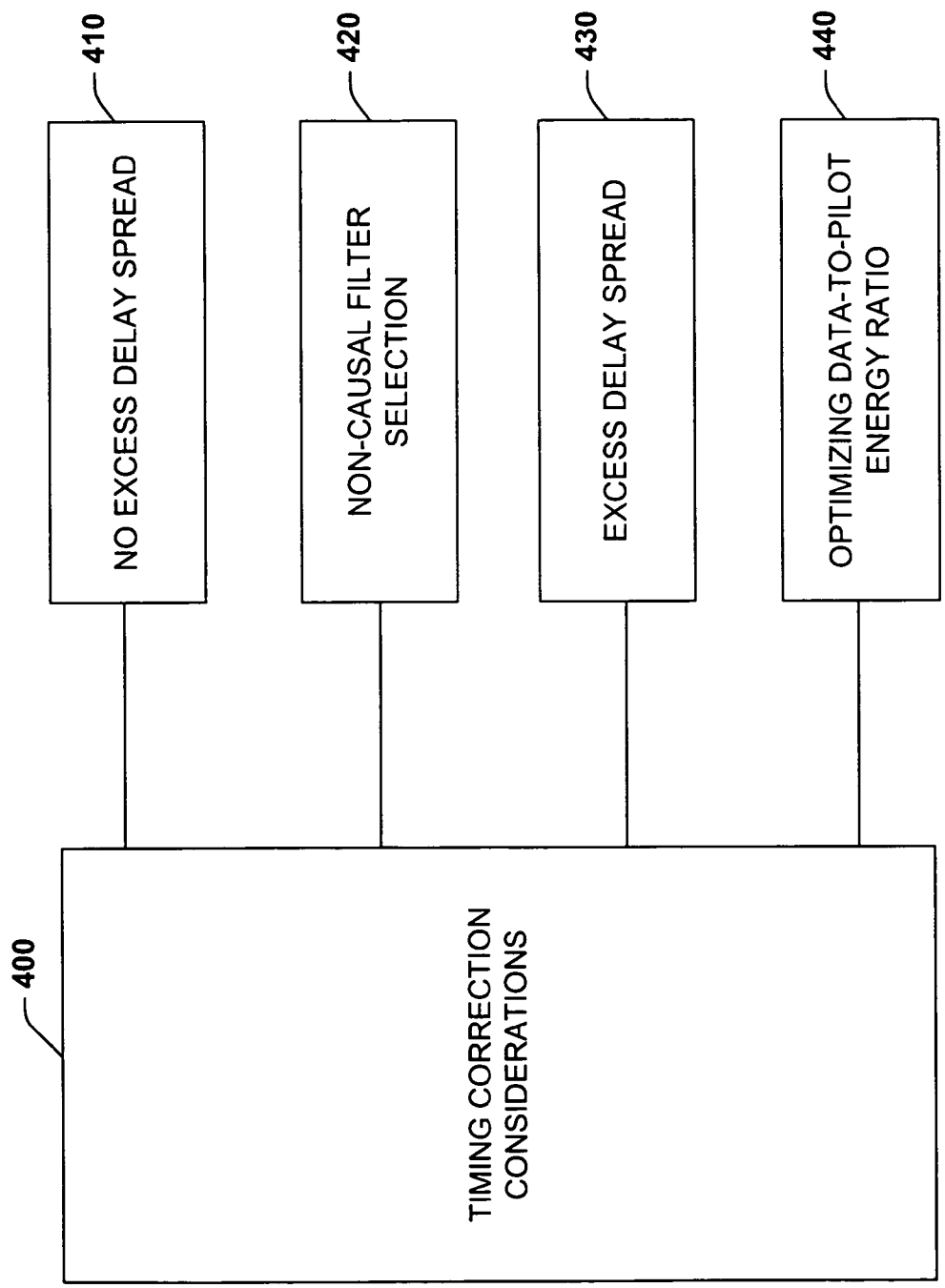
FIG. 4 illustrates example time correction considerations for a wireless receiver.

FIG. 4 illustrates an example time correction considerations 400. At 410, time corrections are considered in view of little or no excess delay spread for transmitted symbols. For a given set of co-efficients $\{\alpha_n\}$, SNR loss from perfect channel estimation can be given by:

$$SNR_{loss} = 10\log\left[1 + \frac{E_d}{E_p}\frac{1}{r^2}\sum \alpha_n^2\left(1 + \frac{1}{SNR_{eff}}\right) + (1 + SNR_{eff})\left(\frac{\sigma_h^2}{r^2} - 1\right)\right] dB \quad \text{Equation 4}$$

It can be assumed that sampling (D=P) and $E_d$ denotes the data symbol energy. The parameters r and $\sigma_h^2$ are related to the time-filter coefficients and variation of the channel across symbols:

$$r = \sum_{n=-N_f}^{N_b-1} \alpha_n R(n) \text{ and } \sigma_h^2 = \sum_{n,n'=-N_f}^{N_b-1} \alpha_n \alpha_{n'} R(n-n')$$

where R(n) is the correlation function of each channel tap, with argument normalized to the OFDM symbol interval $T_s$. For the Jakes model with Doppler frequency $f_d$, $$R(n) = J_0(2\pi f_d T_s n)$$

$SNR_{eff}$ includes the effect of ICI due to Doppler and is related to the actual SNR as:

$$SNR_{eff} = \frac{SNR}{1 + \sigma_{ICI}^2 SNR}$$

where $\pi_{ICI}^2$ can be derived exactly for a given Doppler spectrum. For the Jakes spectrum, a tight upperbound is given by:

$$\sigma_{ICI}^2 = \frac{\pi^2}{6}(f_d T_{FFT})^2$$

where $T_{FFT}$ is the FFT duration (does not include the cyclic prefix).

Proceeding to 420 of FIG. 4, non-causal filter selection is considered. The potential and performance of causal FIR time-filtering ($N_f$=0) of the channel estimates was studied in detail. The filter taps were optimized using the Robust MMSE approach as well as generalized linear regression technique. But, the analytical tradeoff as well as simulation results showed that it may not be possible to get a "reasonable" gain over no time-filtering, for the entire range of speeds (up to 120 km/hr) and spectral efficiencies (<2 bps/Hz) that are being targeted currently. These results pointed to the limitations of using a causal filter.

An improved trade-off can be made if a non-causal filter is provided. The use of more than one non-causal tap may be prohibitive in terms of buffering requirements, so one non-causal tap may be preferred—however more than one can be employed. For simplicity, one past symbol is employed, giving a total of three taps for the time filter. To get an unbiased estimate in static channels, one restriction is that:

$$\Sigma \alpha_n = 1.$$

Figure 5:
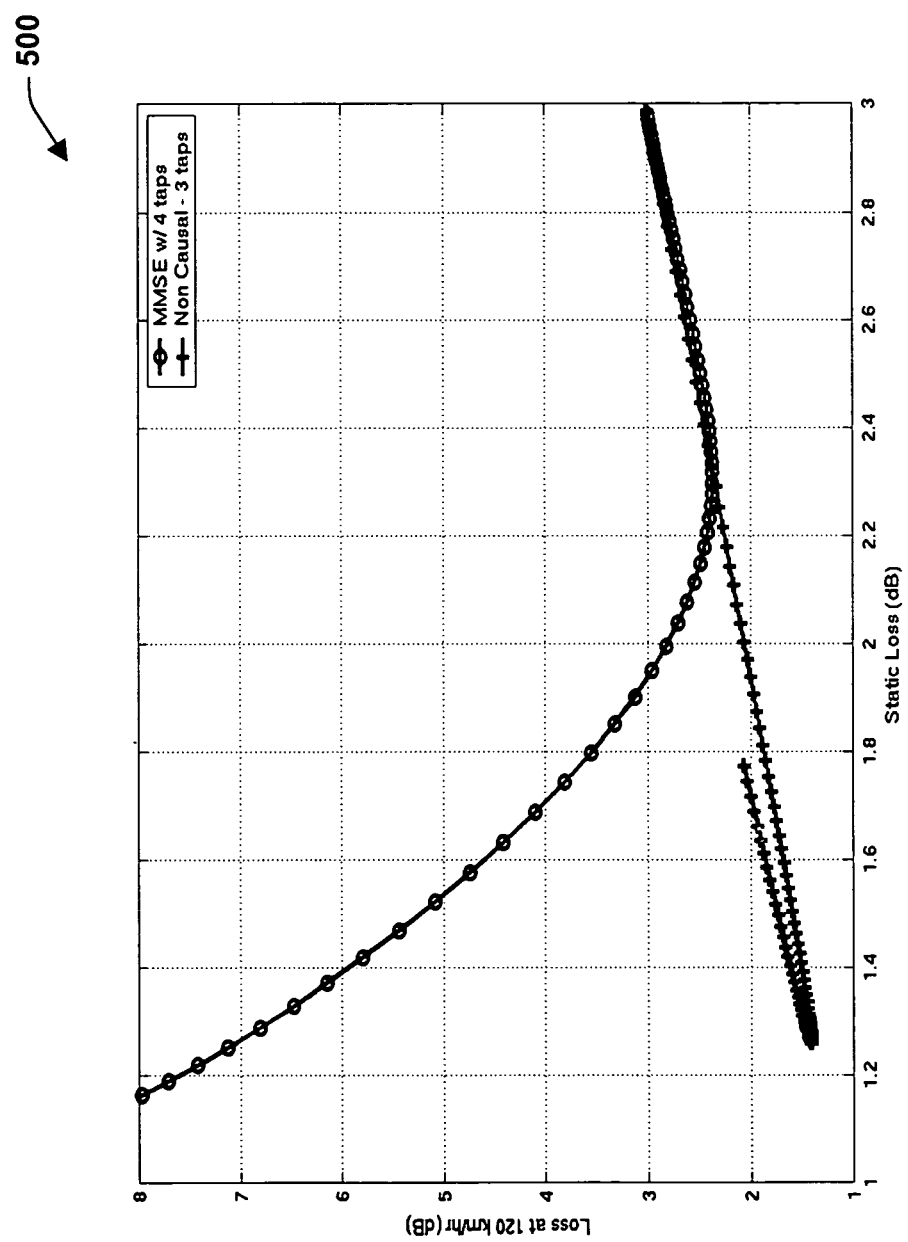
FIG. 5 illustrates an example data boundary pattern.

Further, by symmetry of channel correlation over time, substantially equal weights should be applied for the past and future OFDM symbols, $\alpha_{-1} = \alpha_1$. Under these constraints, the choice of the non-causal filter co-efficient reduces to choosing one parameter—the central tap $\alpha_0$. Using Equation 4 above, $\alpha_0$ can be varied to provide a trade-off between static loss and high-speed loss. Referring briefly FIG. 5, the trade-off with the 4 tap MMSE filter from to a 3 tap non-causal filter is compared via chart 500, at an operating SNR of 20 dB, and using Equation 4. For the non-causal filter, the region of interest is then the lower line from (3,3), which corresponds to no time-filtering, to (1.25, 1.4), which corresponds to having equal weights for the three symbols. From FIG. 3, it is shown that the non-causal filter is robust to time variations at high speeds and provides a better tradeoff than the causal MMSE filter. Furthermore, it may seem best to make all three taps of the non-causal filter equal (to ⅓), since it minimizes the loss in static channels and this loss remains almost the same in high speed channels. However, one should also consider the effect of excess delay spread in choosing the tap weight $\alpha_0$: robustness to excess delay spread in the channel.

Proceeding back to 430 of FIG. 4, excess delay considerations are described. Since the channel is being critically sampled at 512 pilots every OFDM symbol in the frequency domain, time-domain channel taps beyond 512 alias into the first 512 taps. Hence, in the presence of excess delay spread, the observed $l^{th}$ time-domain channel tap can be written as (for even k and pilot in interlace 2)

$$h_l(k) = h_l^{actual}(k) - jh_l^{excess}(k), l=0, \ldots, P-1$$

Further, when the pilots are staggered by four carriers across successive OFDM symbols, the observed channel in the future and past OFDM symbols can be written as $$h_l(k+1) = h_l^{actual}(k+1) + jh_l^{excess}(k+1)$$

$$h_l(k-1) = h_l^{actual}(k-1) + jh_l^{excess}(k-1), l=0, \ldots, P-1$$

Hence, with the non-causal filter, the perfect channel estimate becomes $$\alpha_0 h_l(k) + \frac{1-\alpha_0}{2}[h_l(k-1) + h_l(k+1)] = \quad \text{Equation 5}$$

$$\alpha_0 h_l^{actual}(k) + \frac{1-\alpha_0}{2}[h_l^{actual}(k-1) + h_l^{actual}(k+1)] -$$

$$j\alpha_0 h_l^{excess}(k) + j\frac{1-\alpha_0}{2}[h_l^{excess}(k-1) + h_l^{excess}(k+1)]$$

For the case of a static channel, the actual and excess channels are independent of k, and the filter output simplifies to $h_l^{actual} - (2\alpha_0 - 1) h_l^{excess}$ It is desirable to eliminate the excess delay contribution to the observed channel and estimate the actual channel alone. This can be achieved by setting $\alpha_0$ to ½ instead of ⅓. Another issue is how the non-causal filter would handle time-variations in the excess channel. However, excess channel variation is approximated as linear over the three symbols, it is evident that any symmetric choice of taps will eliminate the time-variation in the excess channel as well. From the above discussion, a choice of {0.25, 0.5, 0.25} for the non-causal taps removes the time-variation in the actual channel, any wrap-around of excess delay channel taps and any time-variations in these excess taps. One issue in choosing these taps instead of equal taps is an increase in the static loss from 1.25 dB to 1.38 dB, which is fairly minimal. Hence, a three-tap filter is adopted with coefficients {0.25, 0.5, 0.25} for generating coded packet error results in the next section.

Proceeding to 440 of FIG. 4, energy considerations are discussed for optimizing a data-to-pilot energy ratio. The preceding discussion assumed that the data symbol energy is about the same as the pilot symbol energy. Under the constraint that the total pilot+data energy is fixed, increased pilot symbol energy leads to better channel estimation (or lower pilot noise), at the expense of lower data symbol SNR (higher data noise.) The ratio can then be chosen to optimize the trade-off. For a static channel, the tradeoff can be optimized analytically and the improvement over the case when the energy ratio is not optimized is $$10\log\left(1 + \sum \alpha_n^2\right) - \left[20\log\left(1 + \sqrt{\frac{P\sum \alpha_n^2}{N-P}}\right) - 10\log\left(\frac{N}{N-P}\right)\right] dB$$

The term in the square brackets is the static loss after the data-to-pilot energy has been optimized. For the non-causal filter, this improvement is equal to about 0.16 dB.

FIGS. 6-9 illustrate example simulations for a timing correction process. Simulation results are presented for QPSK/16 QAM with rate ½ coding (so spectral efficiencies of 1 bps/Hz and 2 bps/Hz) and low/high speed channels. For low speeds, the repeated ATSC channel model was considered with a second cluster 5 dB below the main cluster and at a delay of 40 µs. The ATSC channel model has a strong specular component that is essentially static and the Rayleigh components of the channels are assumed to fade with a speed of 20 km/hr. For high speeds, repeated PEDB profiles are used with the same cluster delay of 40 µs is and a power difference of 5 dB. All paths in the "PEDB" channel are Rayleigh fading at a speed of 120 km/hr. For the results, it can be assumed that there are 96 guard carriers, and the frequency domain interpolation assumes that the channel values at the guard pilots are the same as the channel value at the closest transmitted pilot.

The results in FIGS. 6-9 include the effect of ICI due to channel variation within an OFDM symbol. The ICI should be included in the noise variance estimate that is used in the LLR calculation. An actual noise variance estimation algorithm is used. In addition, a thresholding technique is used to mitigate pilot noise, with a threshold of 0.1. The thresholding is carried out after the time filtering operation in the time domain.

Figure 6:
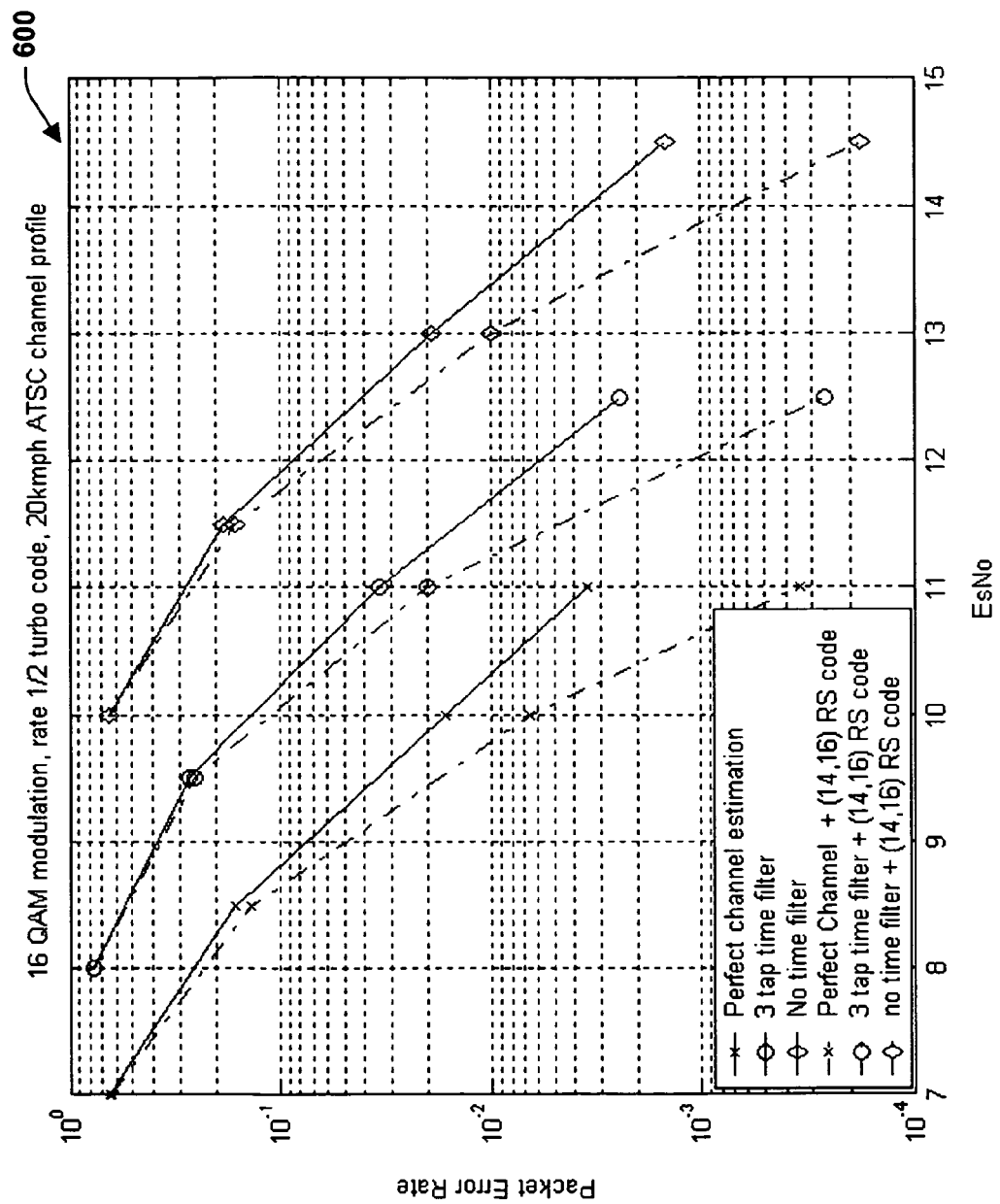
FIGS. 6-9 illustrate example simulation data for a timing correction process.
Figure 7:
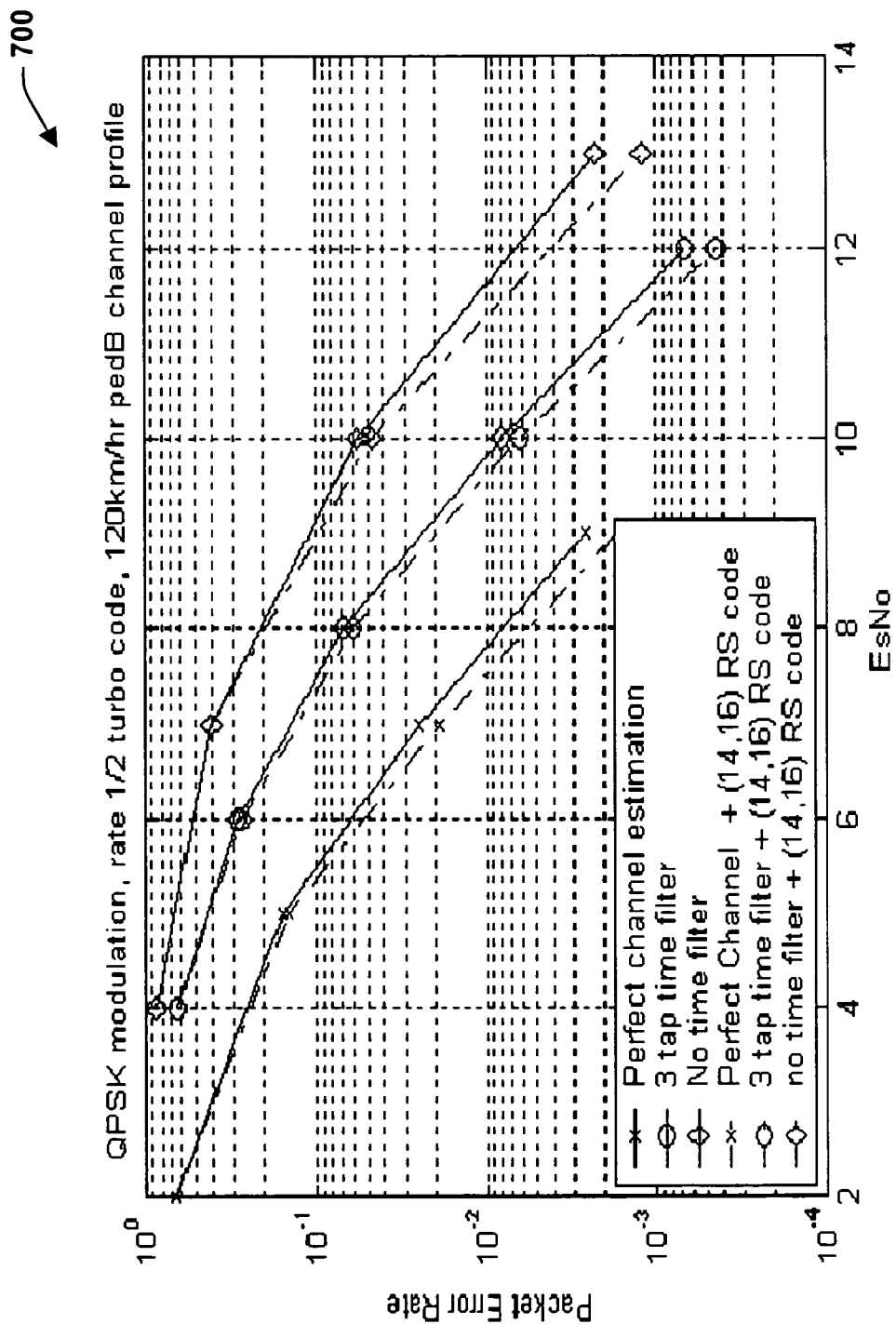
Figure 8:
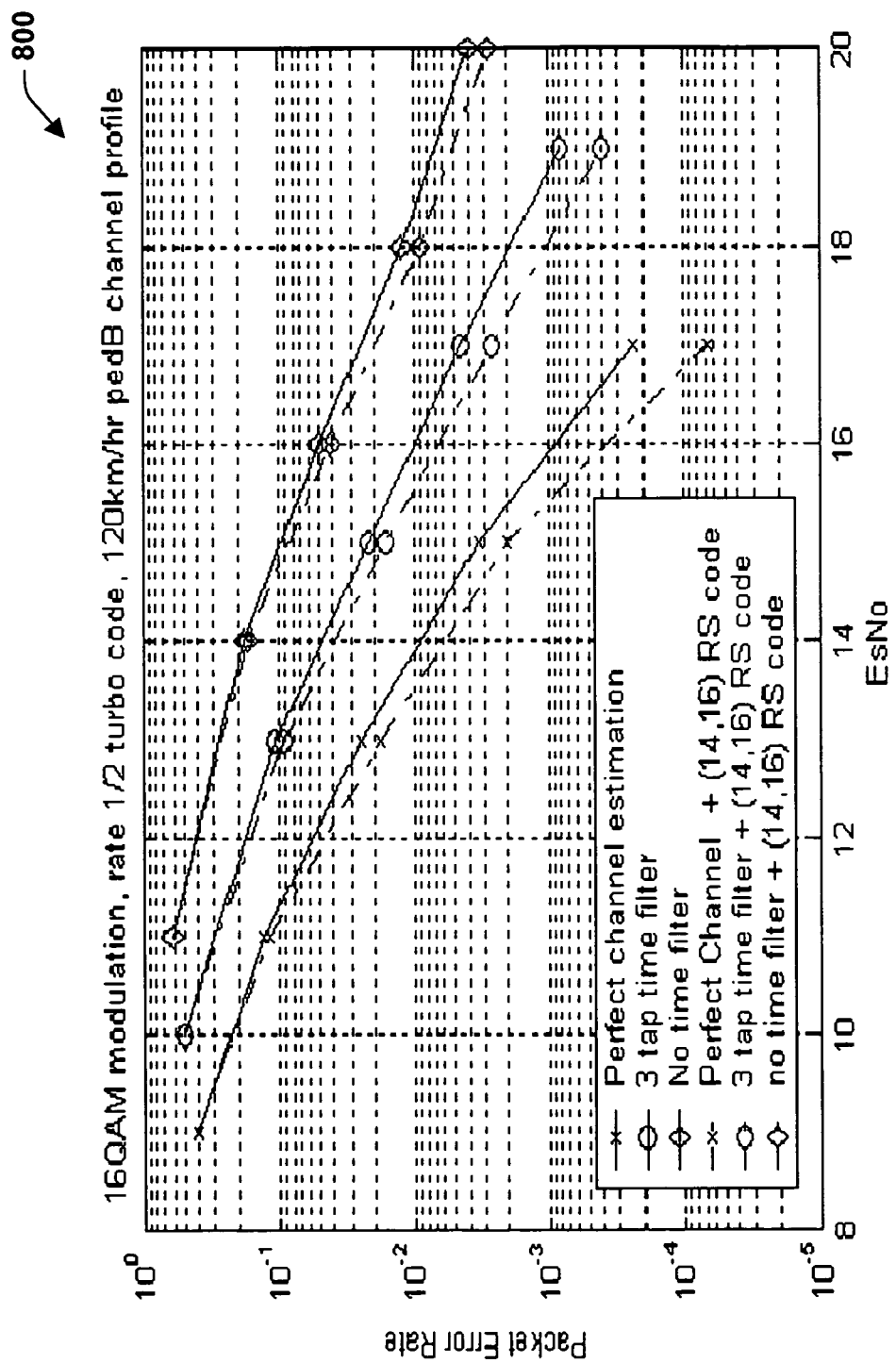
Figure 9:
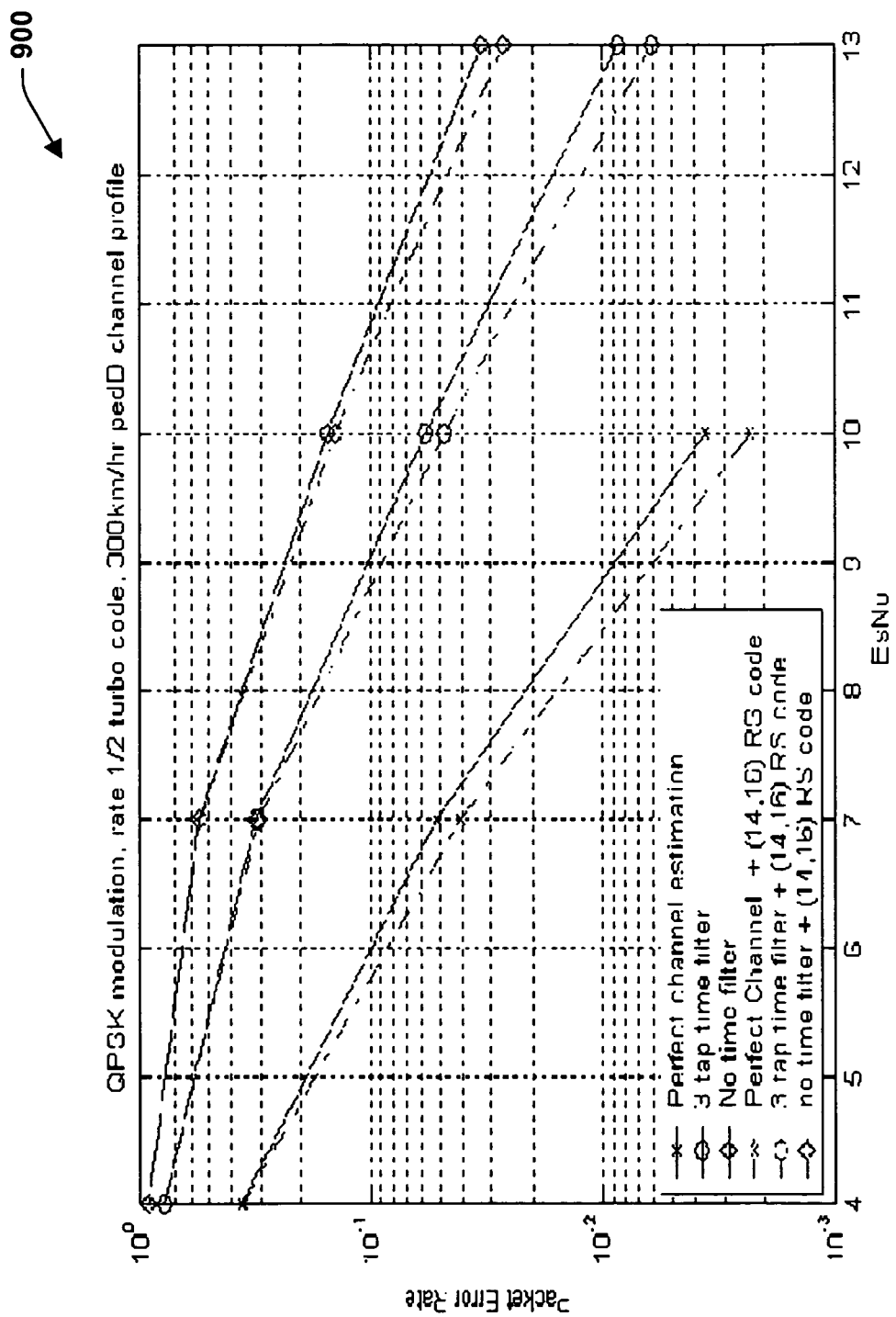

FIGS. 6 and 7 present the performance of QPSK and 16 QAM modulations in a slow fading channel with an ATSC profile. It can be seen that the three tap non-causal filter results in a gain of about 1.6 dB compared to the case of no time filtering in both the cases with a slow fading channel. The performance results in FIG. 8 and FIG. 9 at high speeds confirm that the non-causal filter does indeed cancel out the time variations in the channel reading to a channel estimate which is robust to the time variation error. The robustness of the non-causal filter is more pronounced when compared to the performance of a causal filter (such as robust MMSE for example) in a high speed scenario. FIG. 9 shows the performance of QPSK rate ½ code over a repeated pedB channel profile at a speed of 300 km/hr corresponding to a Doppler of about 195 Hz.

Figure 10:
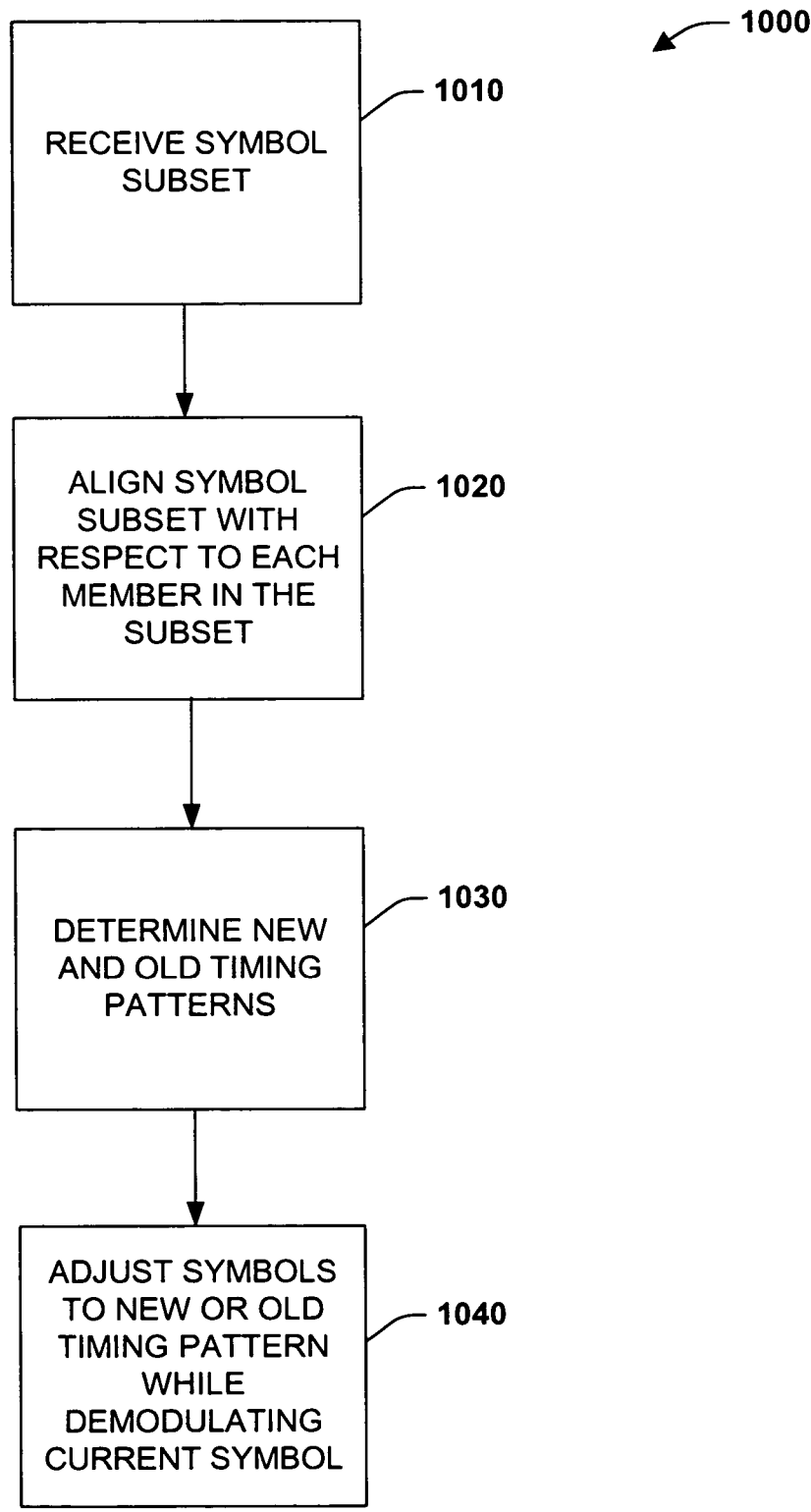
FIG. 10 illustrates an example timing correction process for a wireless system.

FIG. 10 illustrates a timing correction process 1000 for wireless systems. While, for purposes of simplicity of explanation, the methodology is shown and described as a series or number of acts, it is to be understood and appreciated that the processes described herein are not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject methodologies disclosed herein.

Proceeding to 1010, a symbol subset is received by a wireless receiver. At 1020, symbols within the received symbol subset are corrected in time with respect to each symbol in the subset employed for timing correction. After the initial alignment between symbols at 1020, subsequent symbol alignments or adjustments are determined at 1030 where new and old timing patterns are determined. At 1040, and during the demodulation process of received symbols at the wireless receiver, old or new timing patterns are applied to correct one symbol while a current symbol is being demodulated according to another time consideration. As noted above, a subset of filter taps may be selected to perform time synchronization for symbols within the context of a time filter module in a channel estimation block. Thus, as previously noted, while demodulating a current symbol which may be the nth symbol in the subset (n being an integer), timing changes and corrections can be applied concurrently to a proceeding or subsequent symbol in the subset, for example. New or previous timing patterns can be determined where in some cases a new determined time is applied to a respective symbol, and in other cases, a previous timing is applied to account for timing differences between one symbol and the rest of the members of the subset.

Figure 11:
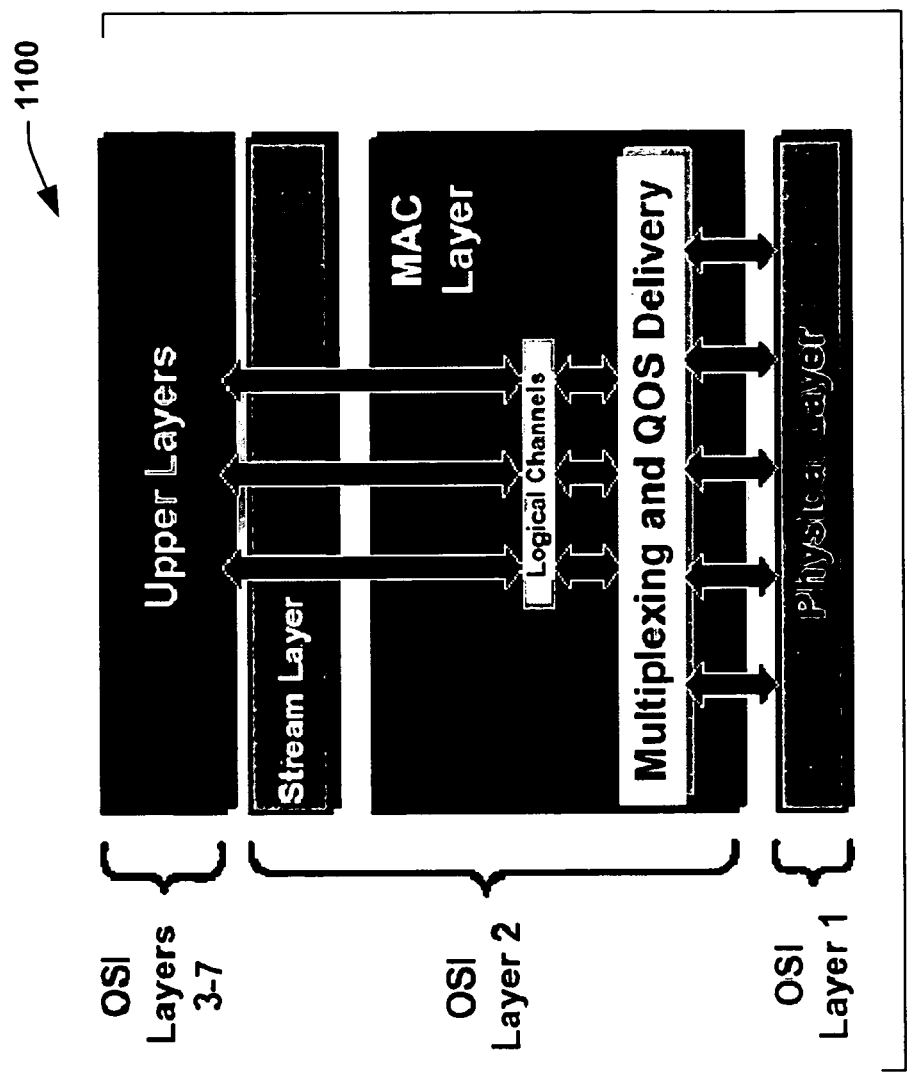
FIG. 11 is a diagram illustrating example network layers for a wireless system.

FIG. 11 illustrates example network layers 1100 for a wireless system. A Forward Link Only (FLO) air interface protocol reference model is shown in FIG. 11. Generally, the FLO air interface specification covers protocols and services corresponding to OS16 having Layers 1 (physical layer) and Layer 2 (Data Link layer). The Data Link layer is further subdivided into two sub-layers, namely, Medium Access (MAC) sub-layer, and Stream sub-layer. Upper Layers can include compression of multimedia content, access control to multimedia, along with content and formatting of control information.

The FLO air interface specification typically does not specify the upper layers to allow for design flexibility in support of various applications and services. These layers are shown to provide context. The Stream Layer includes multiplexes up to three upper layer flows into one logical channel, binding of upper layer packets to streams for each logical channel, and provides packetization and residual error handling functions. Features of the Medium Access Control (MAC) Layer includes controls access to the physical layer, performs the mapping between logical channels and physical channels, multiplexes logical channels for transmission over the physical channel, de-multiplexes logical channels at the mobile device, and/or enforces Quality of Service (QOS) requirements. Features of Physical Layer include providing channel structure for the forward link, and defining frequency, modulation, and encoding requirements In general, FLO technology utilizes Orthogonal Frequency Division Multiplexing (OFDM), which is also utilized by Digital Audio Broadcasting (DAB)7, Terrestrial Digital Video Broadcasting (DVB-T)8, and Terrestrial Integrated Services Digital Broadcasting (ISDB-T). Generally, OFDM technology can achieve high spectral efficiency while effectively meeting mobility requirements in a large cell SFN. Also, OFDM can handle long delays from multiple transmitters with a suitable length of cyclic prefix; a guard interval added to the front of the symbol (which is a copy of the last portion of the data symbol) to facilitate orthogonality and mitigate inter-carrier interference. As long as the length of this interval is greater than the maximum channel delay, reflections of previous symbols are removed and the orthogonality is preserved.

Figure 12:
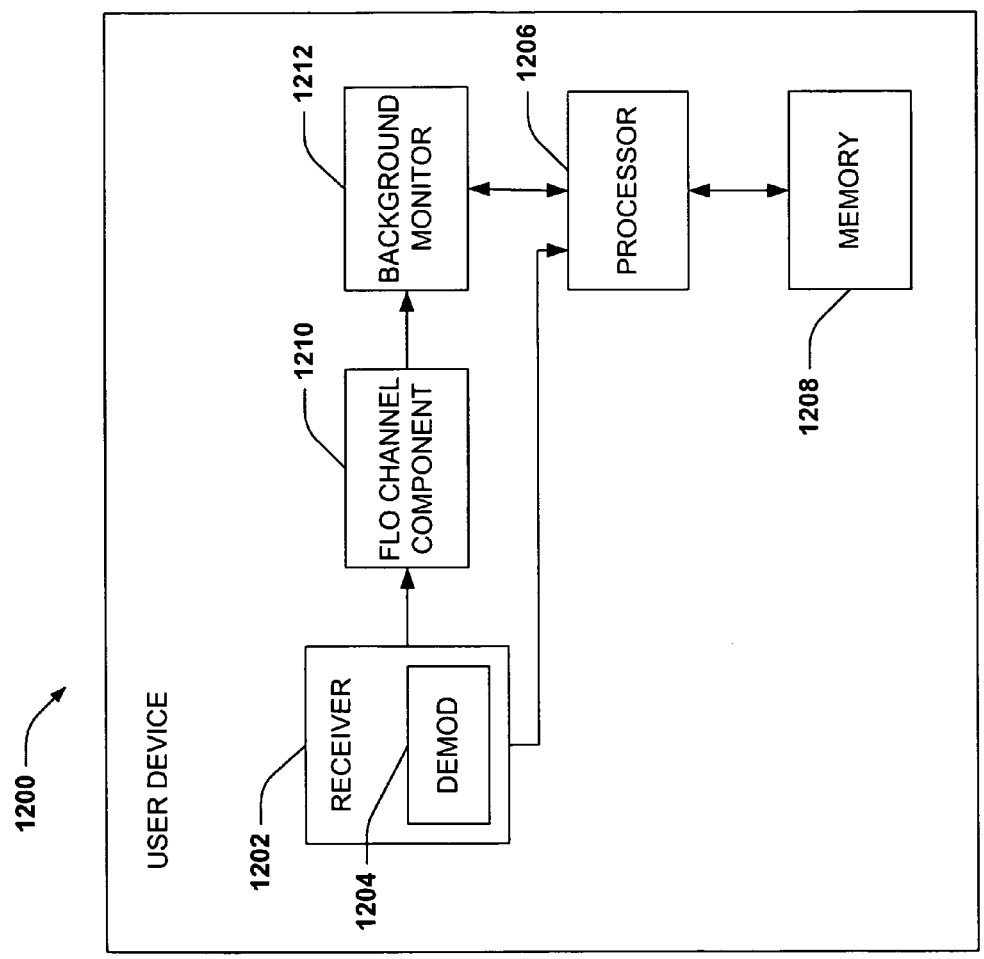
FIG. 12 is a diagram illustrating an example user device for a wireless system.

FIG. 12 is an illustration of a user device 1200 that is employed in a wireless communication environment, in accordance with one or more aspects set forth herein. User device 1200 comprises a receiver 1202 that receives a signal from, for instance, a receive antenna (not shown), and performs typical actions thereon (e.g., filters, amplifies, down converts, etc.) the received signal and digitizes the conditioned signal to obtain samples. Receiver 1202 can be a non-linear receiver. A processor 1206 can be provided for timing synchronization and channel estimation. A FLO channel component 1210 is provided to process FLO signals as previously described. Processor 1206 can be a processor dedicated to analyzing information received by receiver 1202. User device 1200 can additionally comprise memory 1208 that is operatively coupled to processor 1206 and that stores information and instructions related to the embodiments described herein.

It will be appreciated that a data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1208 of the subject systems and methods is intended to comprise, without being limited to, these and any other suitable types of memory. User device 1200 further comprises a background monitor 1214 for processing FLO data.

Figure 13:
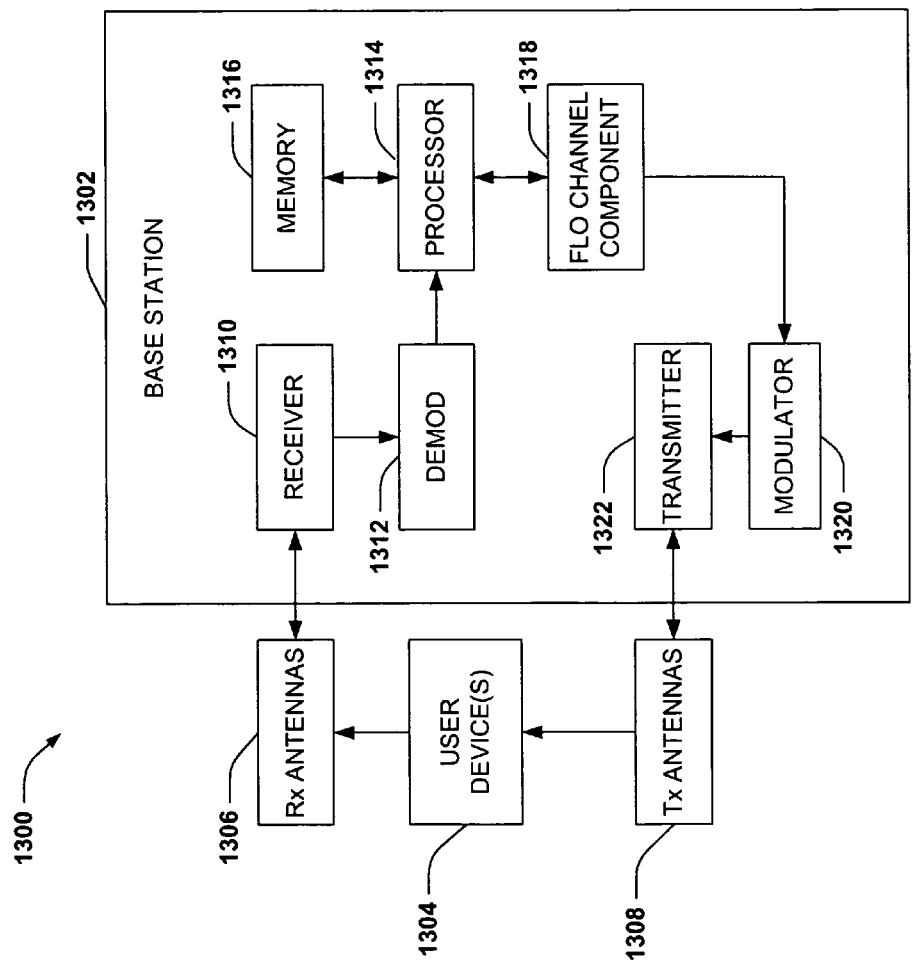
FIG. 13 is a diagram illustrating an example base station for a wireless system.

FIG. 13 is an illustrates an example system 1300 that comprises a base station 1302 with a receiver 1310 that receives signal(s) from one or more user devices 1304 through a plurality of receive antennas 1306, and a transmitter 1324 that transmits to the one or more user devices 1304 through a transmit antenna 1308. Receiver 1310 can receive information from receive antennas 1306 and is operatively associated with a demodulator 1312 that demodulates received information. Demodulated symbols are analyzed by a processor 1314 that is similar to the processor described above, and which is coupled to a memory 1316 that stores information related to user ranks, lookup tables related thereto, and/or any other suitable information related to performing the various actions and functions set forth herein. Processor 1314 is further coupled to a FLO channel 1318 component that facilitates sending FLO information to one or more respective user devices 1304.

A modulator 1322 can multiplex a signal for transmission by a transmitter 1324 through transmit antenna 1308 to user devices 1304. FLO channel component 1318 can append information to a signal related to an updated data stream for a given transmission stream for communication with a user device 1304, which can be transmitted to user device 1304 to provide an indication that a new optimum channel has been identified and acknowledged. In this manner, base station 1302 can interact with a user device 1304 that provides FLO information and employs a decoding protocol in conjunction with a non-linear receiver.

Figure 14:
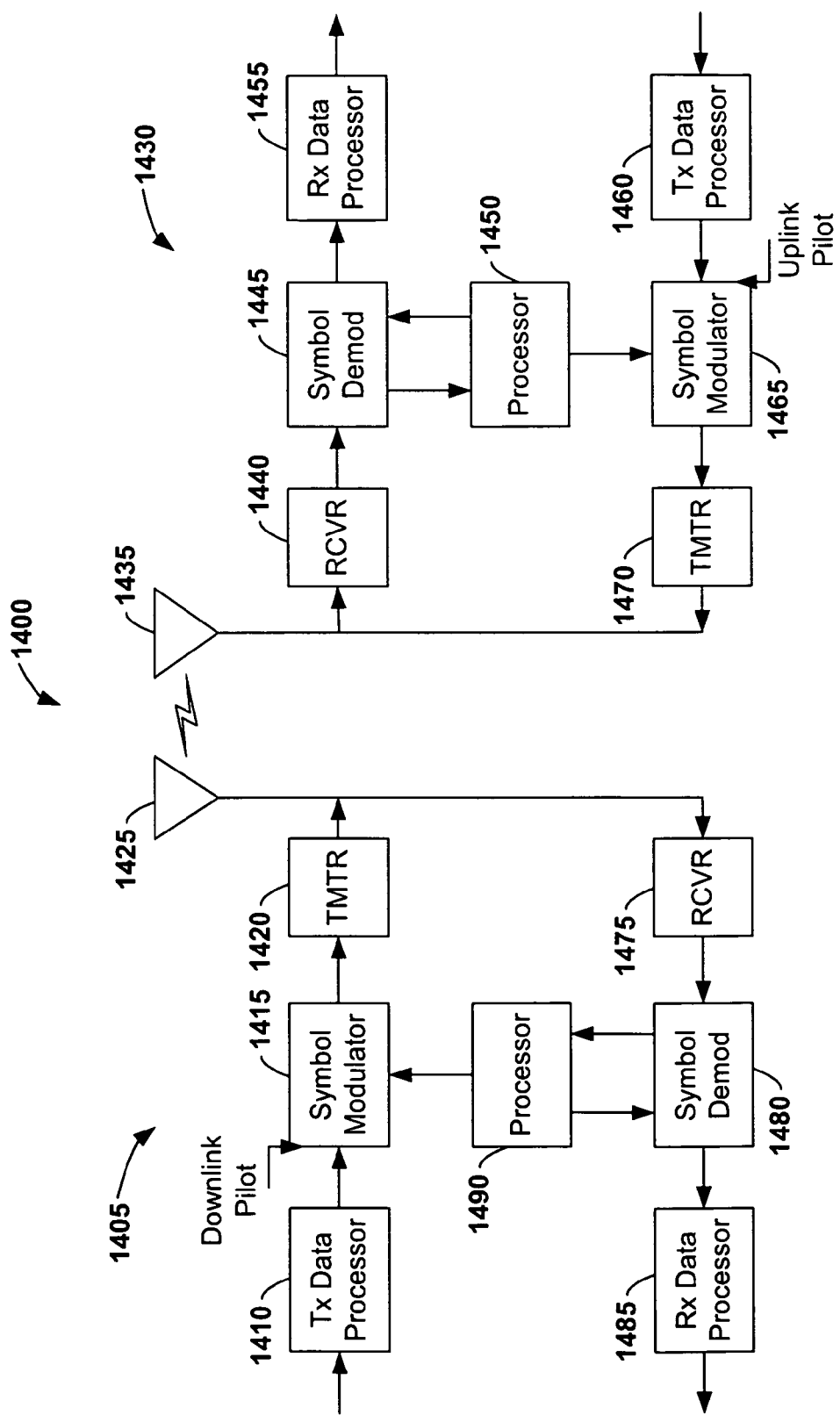
FIG. 14 is a diagram illustrating an example transceiver for a wireless system.

FIG. 14 shows an exemplary wireless communication system 1400. The wireless communication system 1400 depicts one base station and one terminal for sake of brevity. However, it is to be appreciated that the system can include more than one base station and/or more than one terminal, wherein additional base stations and/or terminals can be substantially similar or different for the exemplary base station and terminal described below.

Referring now to FIG. 14, on a downlink, at access point 1405, a transmit (TX) data processor 1410 receives, formats, codes, interleaves, and modulates (or symbol maps) traffic data and provides modulation symbols ("data symbols"). A symbol modulator 1415 receives and processes the data symbols and pilot symbols and provides a stream of symbols. A symbol modulator 1420 multiplexes data and pilot symbols and provides them to a transmitter unit (TMTR) 1420. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

TMTR 1420 receives and converts the stream of symbols into one or more analog signals and further conditions (e.g., amplifies, filters, and frequency up converts) the analog signals to generate a downlink signal suitable for transmission over the wireless channel. The downlink signal is then transmitted through an antenna 1425 to the terminals. At terminal 1430, an antenna 1435 receives the downlink signal and provides a received signal to a receiver unit (RCVR) 1440. Receiver unit 1440 conditions (e.g., filters, amplifies, and frequency down converts) the received signal and digitizes the conditioned signal to obtain samples. A symbol demodulator 1445 demodulates and provides received pilot symbols to a processor 1450 for channel estimation. Symbol demodulator 1445 further receives a frequency response estimate for the downlink from processor 1450, performs data demodulation on the received data symbols to obtain data symbol estimates (which are estimates of the transmitted data symbols), and provides the data symbol estimates to an RX data processor 1455, which demodulates (i.e., symbol de-maps), de-interleaves, and decodes the data symbol estimates to recover the transmitted traffic data. The processing by symbol demodulator 1445 and RX data processor 1455 is complementary to the processing by symbol modulator 1415 and TX data processor 1410, respectively, at access point 1405.

On the uplink, a TX data processor 1460 processes traffic data and provides data symbols. A symbol modulator 1465 receives and multiplexes the data symbols with pilot symbols, performs modulation, and provides a stream of symbols. A transmitter unit 1470 then receives and processes the stream of symbols to generate an uplink signal, which is transmitted by the antenna 1435 to the access point 1405.

At access point 1405, the uplink signal from terminal 1430 is received by the antenna 1425 and processed by a receiver unit 1475 to obtain samples. A symbol demodulator 1480 then processes the samples and provides received pilot symbols and data symbol estimates for the uplink. An RX data processor 1485 processes the data symbol estimates to recover the traffic data transmitted by terminal 1430. A processor 1490 performs channel estimation for each active terminal transmitting on the uplink. Multiple terminals may transmit pilot concurrently on the uplink on their respective assigned sets of pilot subbands, where the pilot subband sets may be interlaced.

Processors 1490 and 1450 direct (e.g., control, coordinate, manage, etc.) operation at access point 1405 and terminal 1430, respectively. Respective processors 1490 and 1450 can be associated with memory units (not shown) that store program codes and data. Processors 1490 and 1450 can also perform computations to derive frequency and impulse response estimates for the uplink and downlink, respectively.

For a multiple-access system (e.g., FDMA, OFDMA, CDMA, TDMA, etc.), multiple terminals can transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 1490 and 1450.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes exemplary embodiments. It is, of course, not possible to describe every conceivable combination of components or methodologies for purposes of describing the embodiments, but one of ordinary skill in the art may recognize that many further combinations and permutations are possible. Accordingly, these embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A timing correction method for a communication system, comprising:
   determining channel observations of two or more symbols modulated on different frequencies;
   aligning symbol timing of the channel observations of the two or more symbols, included in a symbol subset, with respect to each other to account for timing differences between the channel observations of the two or more symbols;
   obtaining a channel estimate based on the channel observations of the two or more symbols from the symbol subset, where the channel observations of the two or more symbols have been aligned in time; and
   demodulating one of the symbols in the symbol subset based on the channel estimate while concurrently correcting the timing for another channel observation of another symbol in the symbol subset based on the timing differences between the channel observations of the two or more symbols.

2. The method of claim 1, further comprising employing the channel estimate to generate timing correction information for the channel observations of the two or more symbols in the subset or channel observations of symbols outside the subset.

3. The method of claim 1, further comprising employing the channel estimate to demodulate data contained in the symbols from the subset or symbols outside the subset.

4. The method of claim 1, further comprising demodulating a first symbol while correcting the timing for a channel observation of a symbol subsequent to the first symbol or a channel observation of a previous symbol prior to the first symbol.

5. The method of claim 1, further comprising determining one or more time filter taps to generate a channel estimate that is used for data demodulation and determining timing corrections.

6. The method of claim 1, further comprising performing a least squares criterion to determine a channel estimate.

7. The timing correction method of claim 1, wherein obtaining a channel estimate includes:
   generating a first channel estimate corresponding to a symbol time period based on a symbol corresponding to said symbol time period and a symbol corresponding to a subsequent symbol time period.

8. The timing correction method of claim 7, further comprising:
   generating a second channel estimate corresponding to said subsequent symbol time period based on the subsequent symbol corresponding to said subsequent symbol time period, the symbol corresponding to said symbol time period, and an additional symbol corresponding to a symbol time period which is subsequent to said subsequent symbol time period.

9. The timing correction method of claim 8, wherein said symbol corresponding to said symbol time period is a member of a first symbol subset used to generate said first channel estimate corresponding to said symbol time period and is also a member of a second symbol subset used to generate said second channel estimate corresponding to said subsequent symbol time period, a timing correction being applied to said symbol when generating the channel estimate corresponding to said subsequent symbol time period but not when generating the channel estimate corresponding to said symbol time period.

10. The method of claim 1, wherein aligning symbol timing of two or more received symbols, included in a symbol subset, with respect to each other to account for timing differences between said two or more received symbols includes:
    cyclically shifting channel observations corresponding to one of said received symbols included in said symbol subset by a first amount; and
    applying a complex multiplication operation to a portion of the shifted channel observations.

11. A timing correction method for a communication system, comprising:
    determining channel observations of symbols;
    aligning symbol timing of channel observations of two or more symbols, included in a symbol subset, with respect to each other to account for timing differences between said two or more symbols; and
    obtaining a channel estimate based on the channel observations of the two or more symbols from the symbol subset, where two or more received channel observations of symbols have been aligned in time;
    performing a channel estimate of length 2P, where P is an integer number of pilot carriers; and
    demodulating one of the symbols in the symbol subset based on the channel estimate while concurrently correcting the timing for another channel observation of another symbol in the symbol subset based on the timing differences between the channel observations of the two or more symbols.

12. The method of claim 11, further comprising employing pilot observations from at least two neighboring symbols to determine timing corrections.

13. The method of claim 11, further comprising employing the channel estimate to generate timing correction information for the received symbols in the subset or symbols outside the subset.

14. The method of claim 11, further comprising employing the channel estimate to demodulate data contained in the received symbols from the subset or symbols outside the subset.

15. The method of claim 11, further comprising demodulating a first symbol while correcting the timing for a symbol received subsequent to the first symbol or a previous symbol received prior to the first symbol.

16. The method of claim 11, further comprising determining one or more time filter taps to generate a channel estimate that is used for data demodulation and determining timing corrections.

17. A wireless receiver comprising:
a processor;
a memory coupled to the processor, the memory configured to store the following components for execution by the processor:
a time filter component to process channel observations of a received symbol subset received in a broadcast network, wherein the symbols in the subset are modulated on different frequencies; and
an alignment component to adjust timing between the channel observations of the symbols in the channel observations of the received symbol subset and to adjust timing of at least one channel observation for a received symbol with respect to other channel observations of received symbols in the subset based on a timing difference between the at least one channel observation of the received symbol and the other channel observations of the received symbols in the subset while concurrently demodulating a current symbol from the symbol subset.

18. The wireless receiver of claim 17, further comprising a component to determine a signal to noise ratio for a channel estimation.

19. The wireless receiver of claim 17, further comprising a component to determine received symbol energy.

20. The wireless receiver of claim 17, further comprising a component to determine parameters relating to time filter coefficients and channel variation across symbols.

21. The wireless receiver of claim 17, further comprising a component to determine a Doppler frequency.

22. The wireless receiver of claim 17, further comprising at least one non-causal filter to generate a channel estimate for data demodulation and timing correction.

23. The wireless receiver of claim 17, further comprising a component to determine excess delay spread.

24. The wireless receiver of claim 17, further comprising at least three time domain filter taps to generate channel estimate data demodulation and timing correction.

25. The wireless receiver of claim 17, further comprising a non-transitory machine readable medium having machine readable instructions stored thereon to execute the time filter component or the alignment component.

26. A wireless receiver comprising:
a processor;
a memory coupled to the processor, the memory configured to store the following components for execution by the processor:
a time filter component to process channel observations of a received symbol subset received in a broadcast network;
an alignment component to adjust timing between the channel observations of the symbols in the received symbol subset and to adjust timing of at least one channel observation of a received symbol with respect to other channel observations of received symbol members in the subset while demodulating a current symbol; and
at least three time domain filter taps to generate channel estimate data demodulation and timing correction, wherein the taps are set to values of {0.25, 0.5, and 0.25 respectively}.

27. The wireless receiver of claim 26, further comprising a component for demodulating the current symbol while correcting the timing for a symbol received subsequent to the current symbol or a previous symbol received prior to the current symbol.

28. The wireless receiver of claim 26, further comprising performing a least squares criterion to determine a channel estimate.

29. The wireless receiver of claim 26, further comprising employing the channel estimate to generate timing correction information for the received symbols in the subset or symbols outside the subset.

30. The wireless receiver of claim 26, wherein the channel estimate data demodulation is based on the received symbols from the subset or symbols outside the subset.

31. The wireless receiver of claim 26, wherein demodulating a first symbol while correcting the timing for a symbol received subsequent to the first symbol or a previous symbol received prior to the first symbol.

32. The wireless receiver of claim 26, wherein a least squares criterion is used to determine a channel estimate data demodulation.

33. A wireless receiver comprising:
a processor;
a memory coupled to the processor, the memory configured to store the following components for execution by the processor:
a time filter component to process channel observations of a symbol subset received in a broadcast network, wherein symbols in the symbol subset are modulated on different frequencies;
an alignment component to adjust timing between the channel observations of the symbols in the symbol subset and to adjust timing of at least one channel observation of a symbol with respect to other channel observations of symbols in the subset based on a timing difference between the at least one channel observation of the symbol and the other channel observations of the symbols in the subset while concurrently demodulating a current symbol from the symbol subset; and
a component to optimize a data to pilot energy ratio based on the symbols in the symbol subset.

34. The wireless receiver of claim 33, wherein demodulating a first symbol while correcting the timing for a symbol received subsequent to the first symbol or a previous symbol received prior to the first symbol.

35. The wireless receiver of claim 33, wherein a least squares criterion is used to determine a channel estimate data demodulation.

36. A time correction component for a wireless receiver, comprising:
  means for determining channel observations of a symbol subset in an OFDM broadcast;
  means for filtering the channel observations of the symbol subset;
  means for aligning channel observations of symbols within the channel observations of the symbol subset; and
  means for aligning one or more channel observations of symbols in view of a current demodulation of one of the symbols of the symbol subset.

37. The component of claim 36, further comprising means for demodulating a first symbol while correcting the timing for a symbol received subsequent to the first symbol or a previous symbol received prior to the first symbol.

38. The component of claim 36, further comprising means for determining one or more time filter taps to generate a channel estimate that is used for data demodulation and determining timing corrections.

39. A memory unit having processor executable code stored thereon, comprising:
  code for controlling a processor to determine channel observations of a symbol subset in a wireless network, wherein symbols in the symbol subset are modulated on different frequencies;
  code for controlling the processor to assign at least three non-causal filter tap structures to align symbol timing of channel observations of symbols within the symbol subset by adjusting for timing differences within the channel observations of the symbol subset; and
  code for controlling the processor to decodes at least one current symbol while adjusting the timing of another channel observation of another symbol in the symbol subset.

40. The memory unit of claim 39, further comprising a code for controlling the processor to decode the current symbol while correcting the timing for a symbol received subsequent to the current symbol or a previous symbol received prior to the current symbol.

41. The memory unit of claim 39, further comprising code for demodulating a first symbol while correcting the timing for a symbol received subsequent to the first symbol or a previous symbol received prior to the first symbol.

42. The memory unit of claim 39, further comprising code for determining one or more time filter taps to generate a channel estimate that is used for data demodulation and determining timing corrections.

43. A wireless communications apparatus, comprising:
  a memory that includes a component to determine time corrections for channel observations of a received symbol subset, wherein symbols in the symbol subset are modulated on different frequencies; and
  at least one processor associated with a receiver that decodes at least one current symbol while adjusting the timing of another channel observation of another symbol in the symbol subset, to align symbol timing of two or more channel observations of symbols in the symbol subset.

44. The apparatus of claim 43, further comprising a component for decoding the current symbol while adjusting the timing for a symbol received subsequent to the current symbol or a previous symbol received prior to the current symbol.

45. A method to perform time synchronization in a communications environment, comprising:
  determining timing corrections to be applied to channel observations with operations based on the relative early or late sampling of OFDM symbols; and
  performing a sampling correction, to align symbol timing of two or more channel observations of received OFDM symbols, based in part on the early or late sampling of the OFDM symbols and timing of a currently demodulated OFDM symbol, wherein the sampling correction is performed by a cyclic shift of one or more samples of the early or late sampling of the OFDM symbols followed by a constant complex multiplication applied on a portion of the one or more samples.

46. The method of claim 45, further comprising demodulating the current symbol while aligning symbol timing for a symbol received subsequent to the current symbol or a previous symbol received prior to the current symbol.

47. A method to perform time synchronization in a communications environment, comprising:
  determining timing corrections to be applied with operations based on the relative early or late sampling of OFDM symbols; and
  performing a sampling correction based in part on the early or late sampling of the OFDM symbols,
  at least one of the following equations being used to perform the sampling correction:
  early sampling correction:

$$y_\alpha(n) = \begin{bmatrix} 0_{(P-x)\times x} & I_{P-x} \\ e^{j2\pi\frac{\alpha}{8}} \cdot I_x & 0_{x\times(P-x)} \end{bmatrix} \cdot y_\alpha^{(early)}(n)$$

late sampling correction:

$$y_\alpha(n) = \begin{bmatrix} 0_{x\times(P-x)} & e^{-j2\pi\frac{\alpha}{8}} \cdot I_x \\ I_{P-x} & 0_{(P-x)\times x} \end{bmatrix} \cdot y_\alpha^{(late)}(n).$$

48. The method of claim 47, the early sampling correction further comprises performing a cyclic right shift of x samples on a value $y_\alpha^{early}(n)$ and then multiplying first x samples obtained after cyclic shift by $$e^{\frac{j2\pi\alpha}{8}}.$$

49. The method of claim 47, the late sampling correction further comprises performing a cyclic left shift of x samples on a value $y^{late}_\alpha(n)$ and then multiplying the last x samples obtained after cyclic shift by $$e^{-\frac{j2\pi\alpha}{8}}.$$

50. An apparatus to perform time synchronization in a communications environment, comprising:
  a first hardware module for determining timing corrections to be applied to channel observations with operations based on the relative early or late sampling of OFDM symbols; and
  a second hardware module for performing a sampling correction, to align symbol timing of two or more channel observations of received OFDM symbols, based in part on the early or late sampling of the OFDM symbols and timing of a currently demodulated OFDM symbol, wherein the sampling correction is performed by a cyclic shift of one or more samples of the early or late sampling of the OFDM symbols followed by a constant complex multiplication applied on a portion of the one or more samples.

51. The apparatus of claim 50, further comprising a module for demodulating the current symbol while aligning symbol timing for a symbol received subsequent to the current symbol or a previous symbol received prior to the current symbol.

52. An apparatus to perform time synchronization in a communications environment, comprising:
  a first hardware module for determining timing corrections to be applied with operations based on the relative early or late sampling of OFDM symbols; and
  a second hardware module for performing a sampling correction based in part on the early or late sampling of the OFDM symbols, using at least one of the following equations:
  early sampling correction:

$$y_\alpha(n) = \begin{bmatrix} 0_{(P-x)\times x} & I_{P-x} \\ e^{j2\pi\frac{\alpha}{8}} \cdot I_x & 0_{x\times(P-x)} \end{bmatrix} \cdot y_\alpha^{(early)}(n)$$

late sampling correction:

$$y_\alpha(n) = \begin{bmatrix} 0_{x\times(P-x)} & e^{-j2\pi\frac{\alpha}{8}} \cdot I_x \\ I_{P-x} & 0_{(P-x)\times x} \end{bmatrix} \cdot y_\alpha^{(late)}(n).$$

53. The apparatus of claim 52, wherein the processor is further configured to, while performing the early sampling correction, perform a cyclic right shift of x samples on a value $y_\alpha^{early}$ (n) and then multiply first x samples obtained after cyclic shift by $$e^{j\frac{2\pi\alpha}{8}}.$$

54. An apparatus to perform time synchronization in a communications environment, comprising:
  means for determining timing corrections to be applied to channel observations with operations based on the relative early or late sampling of OFDM symbols; and
  means for performing a sampling correction, to align symbol timing of two or more channel observations of received OFDM symbols, based in part on the early or late sampling of the OFDM symbols and timing of a currently demodulated OFDM symbol, wherein the sampling correction is performed by a cyclic shift of one or more samples of the early or late sampling of the OFDM symbols followed by a constant complex multiplication applied on a portion of the one or more samples.

55. The apparatus of claim 54, further comprising means for demodulating the current symbol while aligning symbol timing for a symbol received subsequent to the current symbol or a previous symbol received prior to the current symbol.

56. An apparatus to perform time synchronization in a communications environment, comprising:
  means for determining timing corrections to be applied with operations based on the relative early or late sampling of OFDM symbols; and
  means for performing a sampling correction, to align symbol timing of two or more received OFDM symbols, based in part on the early or late sampling of the OFDM symbols,
  wherein said means for performing a sampling correction uses at least one of the following equations for performing the sampling correction:
  early sampling correction:

$$y_\alpha(n) = \begin{bmatrix} 0_{(P-x)\times x} & I_{P-x} \\ e^{j2\pi\frac{\alpha}{8}} \cdot I_x & 0_{x\times(P-x)} \end{bmatrix} \cdot y_\alpha^{(early)}(n)$$

late sampling correction:

$$y_\alpha(n) = \begin{bmatrix} 0_{x\times(P-x)} & e^{-j2\pi\frac{\alpha}{8}} \cdot I_x \\ I_{P-x} & 0_{(P-x)\times x} \end{bmatrix} \cdot y_\alpha^{(late)}(n).$$

57. A memory unit including processor executable code, the memory unit comprising:
  code for causing a processor to determine timing corrections to be applied to channel observations with operations based on the relative early or late sampling of OFDM symbols; and
  code for causing the processor to perform a sampling correction, to align symbol timing of two or more channel observations of received OFDM symbols, based in part on the early or late sampling of the OFDM symbols and timing of a currently demodulated OFDM symbol, wherein the sampling correction is performed by a cyclic shift of one or more samples of the early or late sampling of the OFDM symbols followed by a constant complex multiplication applied on a portion of the one or more samples.

58. The apparatus of claim 57, further comprising a module for demodulating the current symbol while aligning symbol timing for a symbol received subsequent to the current symbol or a previous symbol received prior to the current symbol.

59. An apparatus to perform time synchronization in a communications environment, comprising:
  at least one processor configured to:
    determine timing corrections to be applied to channel observations with operations based on the relative early or late sampling of OFDM symbols; and
    perform a sampling correction, to align symbol timing of two or more channel observations of received OFDM symbols, based in part on the early or late sampling of the OFDM symbols and timing of a currently demodulated OFDM symbol, wherein the sampling correction is performed by a cyclic shift of one or more samples of the early or late sampling of the OFDM symbols followed by a constant complex multiplication applied on a portion of the one or more samples.

60. The apparatus of claim 59, wherein the at least one processor is further configured for demodulating the current symbol while aligning symbol timing for a symbol received subsequent to the current symbol or a previous symbol received prior to the current symbol.

61. A timing correction method for a communication system, comprising:
  receiving symbols;
  aligning symbol timing of two or more received symbols included in a symbol subset, with respect to each other to account for timing differences between said two or more received symbols;

obtaining a channel estimate based on the received symbols from the symbol subset, where two or more received symbols have been aligned in time;

aligning symbol timing of two or more received symbols included in a second symbol subset, with respect to each other to account for timing differences between said two or more received symbols in the second symbol subset, said second symbol subset including at least one symbol which is different from symbols included in said first symbol subset and at least one symbol which is included in the first symbol subset; and obtaining a second channel estimate based on the received symbols from the second symbol subset, wherein two or more received symbols in the second symbol subset have been aligned in time.

* * * * *